US009380620B2

(12) United States Patent
Maguluri et al.

(10) Patent No.: US 9,380,620 B2
(45) Date of Patent: Jun. 28, 2016

(54) METHODS AND APPARATUS RELATING TO CONNECTION AND/OR SESSION ESTABLISHMENT DECISIONS

(75) Inventors: Siva Theja Maguluri, Urbana, IL (US); Sundar Subramanian, Somerville, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 13/350,396

(22) Filed: Jan. 13, 2012

(65) Prior Publication Data

US 2013/0182584 A1 Jul. 18, 2013

(51) Int. Cl.
*H04W 76/02* (2009.01)
*H04W 84/18* (2009.01)

(52) U.S. Cl.
CPC ............ *H04W 76/023* (2013.01); *H04W 84/18* (2013.01)

(58) Field of Classification Search
CPC ................................................ H04L 29/08333
See application file for complete search history.

(56) References Cited

U.S. PATENT DOCUMENTS

| 6,678,252 | B1* | 1/2004 | Cansever ....................... 370/253 |
| 7,489,653 | B2 | 2/2009 | Zhang et al. |
| 8,391,879 | B2 | 3/2013 | Li et al. |
| 2003/0202468 | A1* | 10/2003 | Cain et al. ..................... 370/229 |
| 2005/0053005 | A1* | 3/2005 | Cain et al. ..................... 370/235 |
| 2005/0138178 | A1 | 6/2005 | Astarabadi |
| 2005/0276231 | A1 | 12/2005 | Ayyagari |
| 2008/0130565 | A1 | 6/2008 | Jeong et al. |
| 2008/0159143 | A1* | 7/2008 | Nagarajan et al. ............ 370/235 |
| 2009/0013081 | A1* | 1/2009 | Laroia et al. ................... 709/228 |
| 2009/0022136 | A1* | 1/2009 | Joshi et al. ..................... 370/348 |
| 2009/0232143 | A1* | 9/2009 | Li et al. ....................... 370/395.3 |
| 2010/0048205 | A1 | 2/2010 | Guilford et al. |
| 2010/0120372 | A1* | 5/2010 | Li et al. .......................... 455/68 |

(Continued)

FOREIGN PATENT DOCUMENTS

| WO | 2010054101 | 5/2010 |
| WO | WO2011033173 A1 | 3/2011 |

OTHER PUBLICATIONS

Hakim Badis. Quality of service for ad hoc optimized link state routing protocol (QOLSR), 2006.*

(Continued)

*Primary Examiner* — Ayaz Sheikh
*Assistant Examiner* — Tarell Hampton
(74) *Attorney, Agent, or Firm* — François A. Pelaez

(57) ABSTRACT

Wireless communications devices with existing peer to peer links transmit, e.g., in accordance with a recurring schedule, quality of service related information corresponding to the existing links. The transmitted quality of service related information is, e.g., information indicating an obtained quality of service for the existing link. In some embodiments, quality of service related information is communicated in one of: a peer discovery signal, a connection ID broadcast signal and a contention resolution signal. A wireless communications device seeking to establish a new peer to peer link receives quality of service related information corresponding to existing links and estimates a quality a service achievable on the new desired potential link based on the received quality of service related information. The wireless communications device decides whether or not to establish the new peer to peer link based on its quality of service estimate.

14 Claims, 17 Drawing Sheets

(56) References Cited

U.S. PATENT DOCUMENTS

2010/0178949 A1    7/2010  Jang et al.
2010/0238897 A1*   9/2010  Kiribayashi .................. 370/331
2012/0236806 A1*   9/2012  Doppler ............... H04W 28/16
                                                             370/329

OTHER PUBLICATIONS

International Search Report and Written Opinion—PCT/US2013/021273—ISA/EPO—Apr. 19, 2013.

* cited by examiner

| FIGURE 9A | FIGURE 9B |

METHODS AND APPARATUS RELATING TO CONNECTION AND/OR SESSION ESTABLISHMENT DECISIONS

FIELD

Various embodiments relate to decentralized control in wireless communications networks, and more particularly, to methods and apparatus relating to connection and/or session establishment, e.g., in a peer to peer network, e.g., a peer to peer ad-hoc network where direct device to device communications is supported.

BACKGROUND

Admission control is important in networks with delay sensitive traffic like voice or to give service guarantees to users. In traditional networks, a central authority makes the admission decision based on the quality of service of the existing users. But an ad hoc network normally does not have a central authority to make this decision. Existing admission control algorithms in this setting are often very basic and normally cannot guarantee Quality of Service.

It would be desirable if a device seeking to establish a connection requiring a particular type of service had sufficient information to estimate the quality of service it will receive for the particular type of service if it proceeds with establishing a connection or establishment of a session for the service, e.g., voice service, data service or video service. Unfortunately, in many ad hoc networks it is not possible to reliably predict the quality of service which will be obtained prior to establishing a connection or establishing a communications session because of the limited information available to the device considering establishing the connection or communications session.

In view of the above, it should be appreciated that there is a need for improved methods and/or apparatus for deciding, based on quality of service constraints, whether or not to proceed with establishment of a connection or communications session.

SUMMARY

Various exemplary described methods and apparatus are well suited for peer to peer networks, e.g., ad hoc peer to peer networks, implementing a decentralized control approach. The peer to peer networks in various embodiments support direct device to device communication. Wireless communications devices with existing peer to peer links transmit, e.g., in accordance with a recurring schedule, quality of service related information corresponding to the existing links. The transmitted quality of service related information is, e.g., information indicating an obtained quality of service for the existing link. In some embodiments, the transmitted quality of service related information is communicated using relatively few information bits, e.g., 8 or less information bits. In some embodiments, quality of service related information, corresponding to an existing peer to peer link, is communicated in one of: a peer discovery signal, a connection ID broadcast signal and a contention resolution signal. A wireless communications device seeking to establish a new peer to peer link receives quality of service related information corresponding to existing links and estimates a quality a service achievable on the new desired potential link, e.g., connection, based on the received quality of service related information. The wireless communications device decides whether or not to establish the new peer to peer link based on its quality of service estimate.

An exemplary method of operating a first wireless communication device, in accordance with some embodiments, comprises: receiving a quality of service related signal from at least a second wireless communications device in a recurring time slot, said quality of service related signal being a broadcast signal corresponding to an existing peer to peer link; and estimating a quality of service achievable at the first wireless communications device based on the received quality of service related signal. The exemplary method further comprises deciding to establish a peer to peer link with another device or not to establish a peer to peer link with another device based on the quality of service estimate.

An exemplary first wireless communications device, in accordance with some embodiments, comprises: at least one processor configured to: receive a quality of service related signal from at least a second wireless communications device in a recurring time slot, said quality of service related signal being a broadcast signal corresponding to an existing peer to peer link; estimate a quality of service achievable at the first wireless communications device based on the received quality of service related signal; and decide whether or not to establish a peer to peer link with another device based on the quality of service estimate. The exemplary first wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
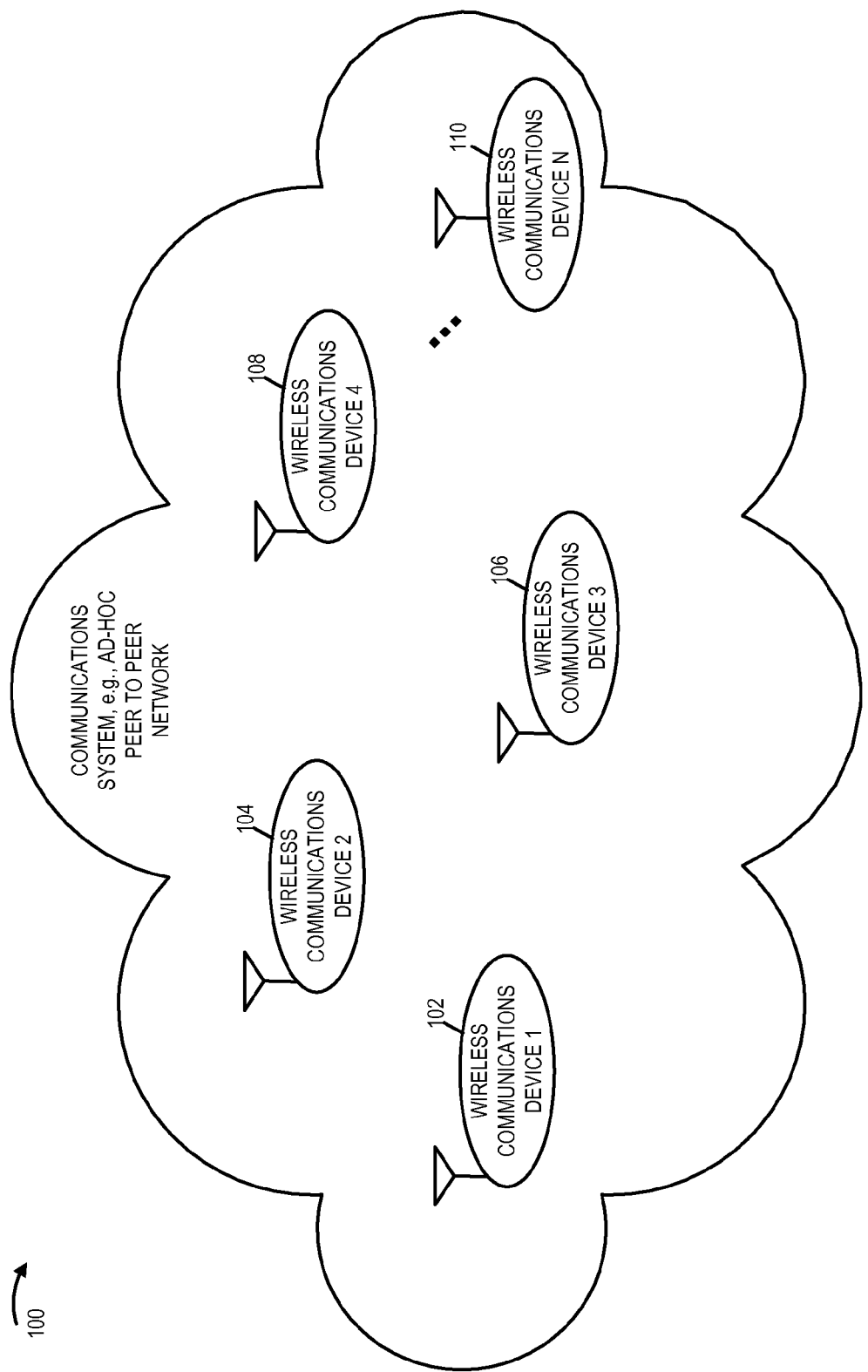
FIG. 1 is a drawing of an exemplary communications system, e.g., an ad-hoc peer to peer network, in accordance with various exemplary embodiments.

FIG. 1 is a drawing of an exemplary wireless communications system 100, e.g., an ad-hoc peer to peer network, in accordance with an exemplary embodiment. In at least some embodiments, peer to peer communication involves direct device to device communication, e.g., without the communication passing through an infrastructure element, such as a base station, located between two peer devices. Exemplary wireless communications system 100 includes a plurality of wireless communications devices, e.g., peer to peer wireless communication devices, (wireless communications device 1 102, wireless communications device 2 104, wireless communications device 3 106, wireless communications device 4 108, . . . , wireless communications device N 110). At least some of the wireless communications devices (102, 104, 106, 108, . . . , 110) are mobile wireless communications devices which may move throughout the communications system 100. Exemplary system 100 is a system using decentralized control, e.g., decisions regarding whether or not to establish a peer to peer link and/or communications session with another wireless communications device are made by a wireless communications that would like to establish the link rather than by a central controller.

In various embodiments, a wireless communications device, having an existing link broadcasts a signal or signals communicating quality of service related information corresponding to the existing link. A wireless communications which is considering establishing a new link, receives the quality of service related signals being broadcast by other wireless communications devices with existing links which happen to be in its vicinity, and the wireless communications devices makes a decision as to whether or not to establish the new link as a function of the received quality of service related information corresponding to the existing links.

In some embodiments, the quality of service related signals are peer discovery signals in peer discovery slots in a peer to peer recurring schedule. In some other embodiments, the quality of service related signals are connection ID (CID) broadcast signals in CID broadcast slots in a peer to peer recurring schedule. In still other embodiments, the quality of service related signals are contention resolution signals in contention resolution slots, e.g., traffic resource resolution signals in traffic contention resolution slots, in a peer to peer recurring schedule.

Figure 2:
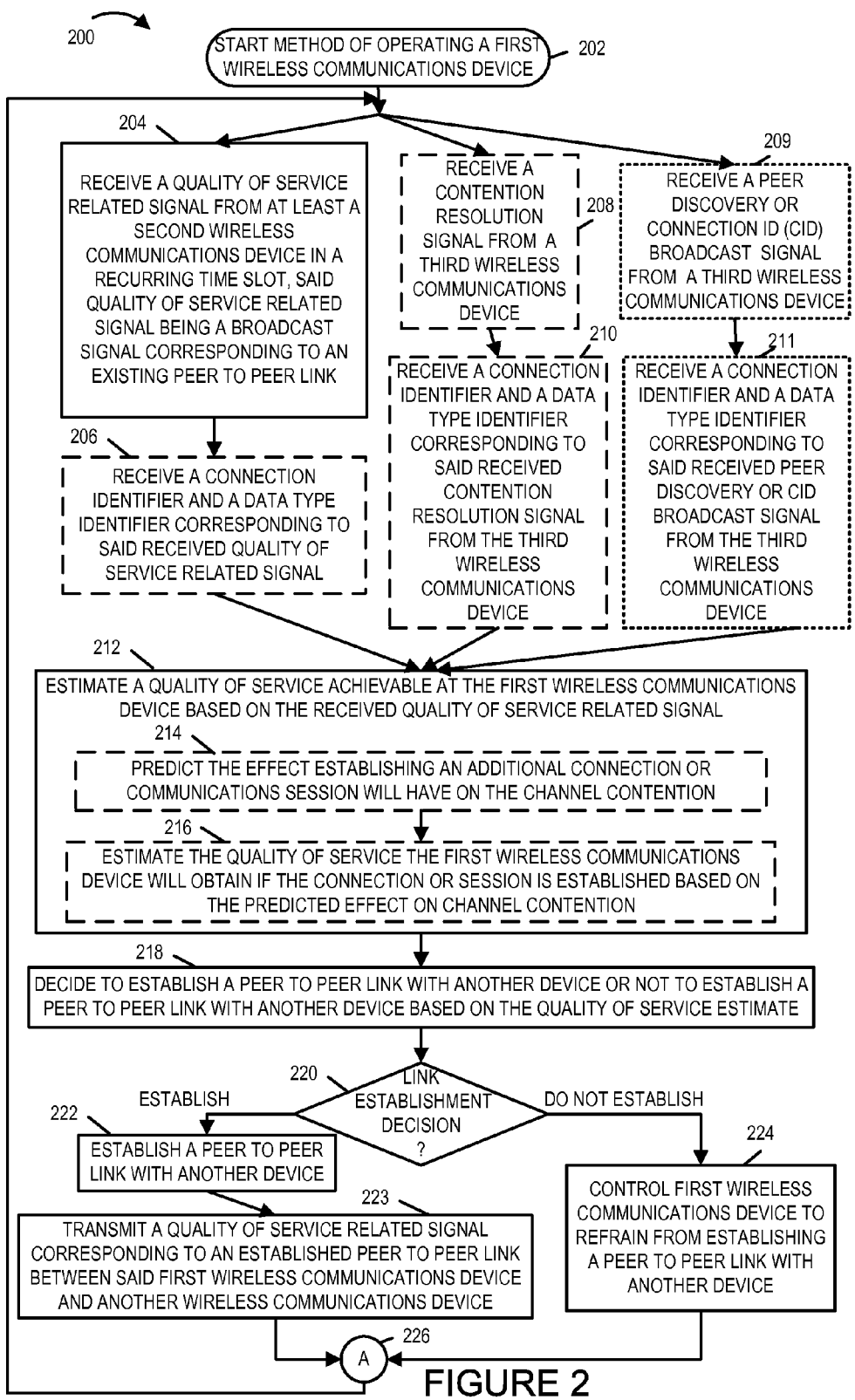
FIG. 2 is a flowchart of an exemplary method of operating a first wireless communications device in accordance with various exemplary embodiments.

FIG. 2 is a flowchart 200 of an exemplary method of operating a first wireless communications device in accordance with an exemplary embodiment. The first wireless communications device is, e.g., one of the peer to peer wireless communications devices of peer to peer network 100 of FIG. 1. Operation of the exemplary method starts in step 202 where the first wireless communications device is powered on and initialized. Operation proceeds from start step 202 to step 204. In some embodiments, operation also proceeds from start step 202 to step 208 and/or to step 209.

Returning to step 204, in step 204 the first wireless communications device receives a quality of service related signal from at least a second wireless communications device in a recurring time slot, said quality of service related signal being a broadcast signal corresponding to an existing peer to peer link. In some embodiments, the recurring time slot is a peer discovery and/or connection ID (CID) broadcast slot dedicated for sending link information, e.g., link performance information. In some embodiments a CID broadcast indicates if a connection is used and the associated quality being achieved. In some other embodiments, the recurring time slot is a traffic contention slot in which traffic contention signaling is communicated in which wireless communications devices fight over the right to use traffic resources, e.g., contend for the right to use traffic resources in accordance with a predetermined set of rules including yielding rules.

In various embodiments, the quality of service related signal is a broadcast signal that communicates information about an obtained quality of service level. In some embodiments, the quality of service related signal from the second communications device communicates performance metric information indicating a performance level obtained by the second wireless communications device. In some such embodiments, the performance metric information includes at least one of a dropped packet rate, a latency, and a QoS level obtained by a particular class of information being communicated. Exemplary classes of data that may be communicated include, e.g., voice and best effort data.

In some embodiments, the quality of service related signal corresponds to a peer to peer connection identifier. In some such embodiments, the quality of service related signal is further transmitted by the second wireless communications device in association with a data type identifier. In some embodiments, the quality of service related signal, corresponding peer to peer connection identifier, and associated data type identifier are transmitted according to a recurring broadcast transmission schedule.

In some embodiments, operation proceeds from step 204 to step 212; in other embodiments, operation proceeds from step 204 to step 206. In step 206 the first communications device receives a connection identifier and a data type identifier corresponding to said received quality of service related signal. In some embodiments, it is reasonable to assume that similar data types might expect similar results. In some such embodiments, the first wireless communication device looks for received quality of service related signals that have a data type corresponding to the data type that the wireless communications device expects to communicate on a new link should it decide to establish the new link. In some such embodiments, the first wireless communications uses the information from the information communicated in the quality of service related signal from the second wireless communications device if the data type matches the data type that it intends to transmit, but does not use the information from the information communicated in the quality of service related signal from the second wireless communications device if the data type does not matches the data type that it intends to transmit. In some such embodiments, the first wireless communications gives a higher weighting to the information communicated in the quality of service related signal from the second wireless communications device if the data type matches the data type that it intends to transmit should the first wireless communications device establish a new link. Operation proceeds from step 206 to step 212.

Returning to step 208, in step 208 the first wireless communications device receives a contention resolution signal from a third wireless communications device, e.g., a traffic resource resolution signal. In some such embodiments, the received quality of service related signal from at least a second wireless communications device is a contention resolution signal which communicates QoS information. Operation proceeds from step 208 to step 210. In step 210 the first wireless communications device receives a connection identifier and a data type identifier corresponding to said received contention resolution signal from the third wireless communications device. Operation proceeds from step 210 to step 212.

In step 209 the first wireless communications device receives a peer discovery signal or connection ID (CID) broadcast signal from a third communications device. In some such embodiments, the received quality of service related signal from the second wireless communications device is one of a peer discovery signal and connection identifier (CID) broadcast signals communication which communicates QoS information. Operation proceeds from step 209 to step 211. In step 211 the first wireless communications device receives a connection identifier and a data type identifier corresponding to said received peer discovery signal or CID broadcast signal from the third wireless communications device.

In step 212 the first wireless communications device estimates a quality of service achievable at the first wireless communications device based on the received quality of service related signal. In some embodiments, estimating the quality of service achievable at the first wireless communications device is based on contention resolution signals received from a plurality of wireless communications devices, e.g., a plurality of wireless communications devices including the second and third wireless communications devices. In some embodiments, estimating the quality of service achievable at the first wireless communications device is based on peer discovery signals received from a plurality of wireless communications devices, e.g., a plurality of wireless communications devices including the second and third wireless communications devices. In some embodiments, estimating the quality of service achievable at the first wireless communications device is based on connection ID broadcast signals received from a plurality of wireless communications devices, e.g., a plurality of wireless communications devices including the second and third wireless communications devices. In some embodiments, step 212 includes steps 214 and 216. In step 214 the first wireless communications device predicts the effect of establishing an additional connection or communications session will have on the channel contention.

Then in step 216, the first wireless communications device estimates the quality of service the first wireless communications device will obtain if the connection or session is established based on the predicted effect on the channel contention. Operation proceeds from step 212 to step 218.

In step 218 the first wireless communications device decides to establish a peer to peer link with another device or not to establish a peer to peer link with another device based on the quality of service estimate. Operation proceeds from step 218 to step 220.

In step 220, if the first wireless communications device has decided to establish a peer to peer link with another device, then operation proceeds from step 220 to step 222; otherwise operation proceeds from step 220 to step 224.

Returning to step 222, in step 222 the first wireless communications device establishes a peer to peer link with another device. Operation proceeds from step 222 to step 223 in which the first wireless communications device transmits a quality of service related signal corresponding to an established peer to peer link between said first wireless communications device and another wireless communications device. Operation proceeds from step 223 to connecting node A 226. Returning to step 224, in step 224 the first wireless communications device is controlled to refrain from establishing a peer to peer link with another device. Operation proceeds from step 224 to connecting node A 226. Operation proceeds from connecting node A 226 to step 204, and in some embodiments, to step 208.

In various embodiments, the exemplary method further includes a step of generating a quality of service related signal corresponding a peer to peer link of the first wireless communications device, e.g., following establishment of a link in step 222, and prior to a step of transmitting, e.g., prior to step 223. In various embodiments, the generated quality of service related signal is transmitted, e.g., as a broadcast signal, in a recurring time slot. In some embodiments, the exemplary method further includes communicating a connection identifier and a data type identifier corresponding to the generated quality of service related signal. In some embodiments, the generated quality of service related signal, corresponding connection identifier, and corresponding data type identifier are communicated in the same signal.

Figure 3:
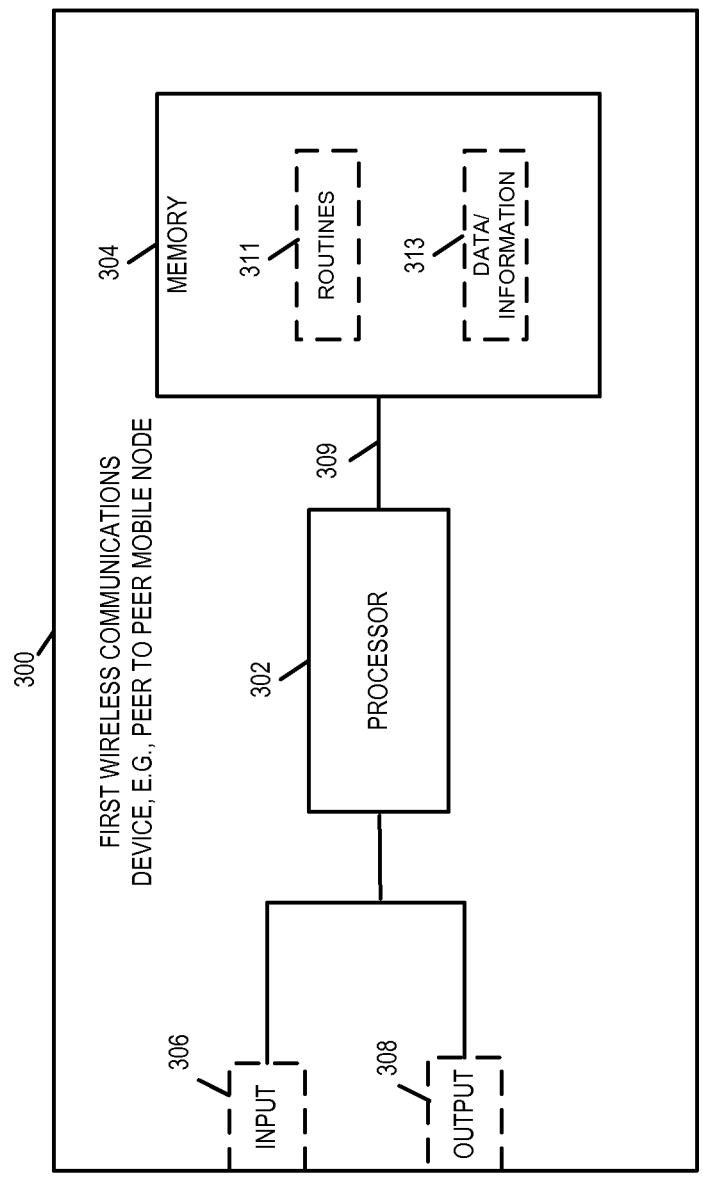
FIG. 3 is a drawing of an exemplary first wireless communications device in accordance with an exemplary embodiment.

FIG. 3 is a drawing of an exemplary first wireless communications device 300, e.g., a peer to peer wireless communications device, in accordance with an exemplary embodiment. Exemplary first communications device 300 is, e.g., one of the peer to peer wireless communications devices of system 100 of FIG. 1. Exemplary first wireless communications device 300 may, and sometimes does, implement a method in accordance with flowchart 200 of FIG. 2.

First wireless communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to: receive a quality of service related signal from at least a second wireless communications device in a recurring time slot, said quality of service related signal being a broadcast signal corresponding to an existing peer to peer link; estimate a quality of service achievable at the first wireless communications device based on the received quality of service related signal; and decide whether or not to establish a peer to peer link with another device based on the quality of service estimate. In various embodiments, the quality of service related signal is a broadcast signal that communicates information about an obtained quality of service level. In some embodiments, the quality of service related signal from the second wireless communications device communicates performance metric information indicating a performance level obtained by said second wireless communications device. In some such embodiments, the performance metric information includes at least one of a dropped packet rate, a latency, and a QoS level obtained by a particular class of data being communicated, e.g., voice or best effort data etc.

In various embodiments, the quality of service related signal corresponds to a peer to peer connection identifier. In some such embodiments, the quality of service related signal is further transmitted in association with a data type identifier, and processor 302 is further configured to receive, in addition to said quality of service related signal, a corresponding connection identifier and an associated data type identifier. In some such embodiments, the quality of service related signal, corresponding peer to peer connection identifier and associated data type identifier are transmitted according to a predetermined recurring broadcast transmission schedule.

Processor 302, in some embodiments, is further configured to: receive a contention resolution signal, e.g. a traffic resource resolution signal, from a third wireless communications device, and wherein said received quality of service related signal from at least a second wireless communications device is a contention resolution signal which communicates QoS information; and processor 302 is configured to base the estimate of the quality of service achievable at the first wireless communications device on contention resolution signals received from a plurality of different wireless communications devices.

In various embodiments, processor 302 is configured to: predict the effect establishing an additional connection or communications session will have on channel contention; and estimate the quality of service the first wireless communications device will obtain if the connection or session is established based on the predicted effect on channel contention, as part of being configured to estimate the quality of service achievable for the first wireless communications device.

In some embodiments, processor 302 is further configured to generate a quality of service related signal corresponding to an established peer to peer link between said first wireless communications device and another wireless communications device and to transmit a generated quality of service related signal corresponding to an established peer to peer link between said first wireless communications device and another wireless communications device.

Figure 4:
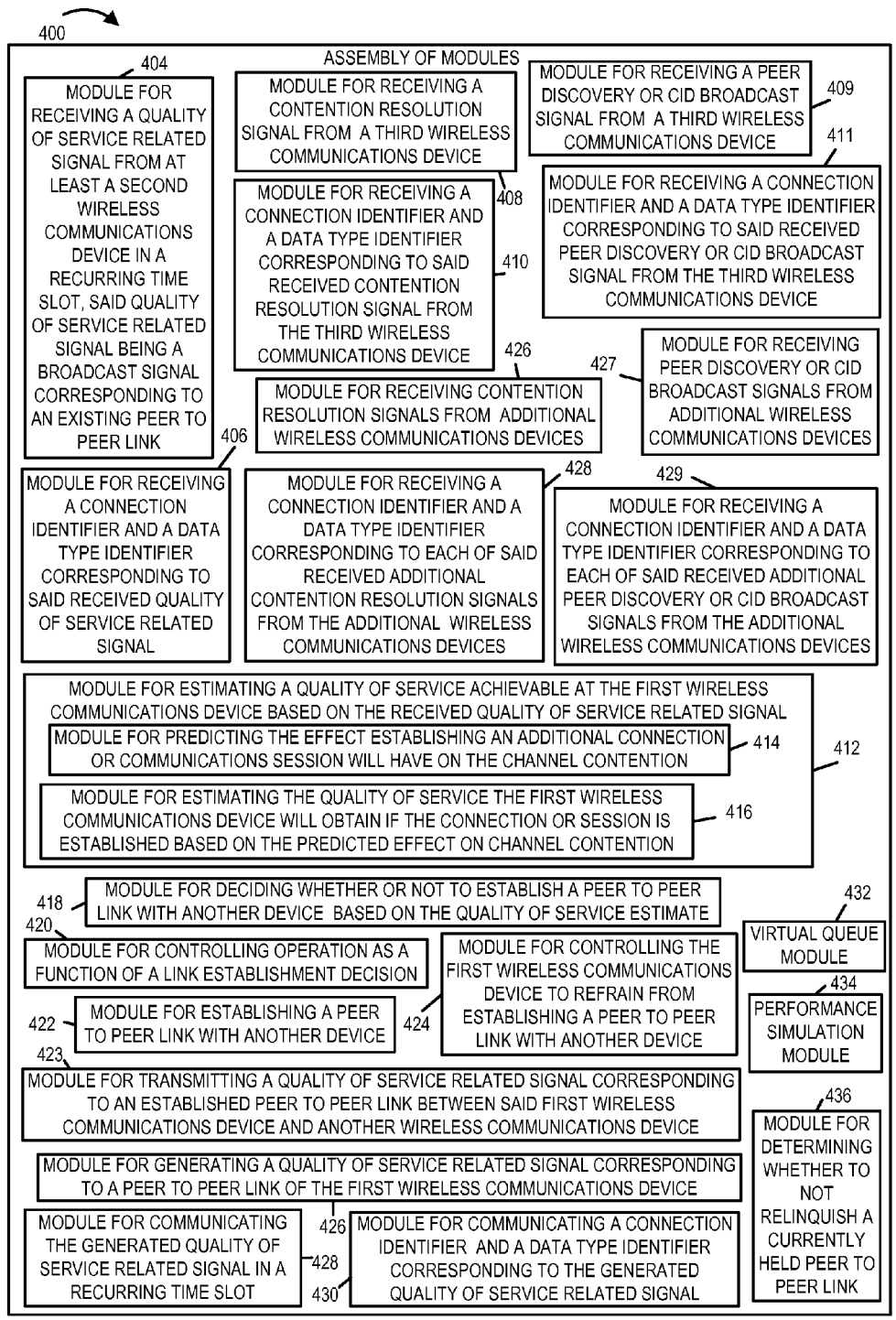
FIG. 4 is an assembly of modules which can, and in some embodiments is, used in the exemplary first wireless communications device illustrated in FIG. 3.

FIG. 4 is an assembly of modules 400 which can, and in some embodiments is, used in the exemplary first wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of first communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated and/or described in the method of flowchart 200 of FIG. 2.

Assembly of modules 400 includes a module for receiving a quality of service related signal from at least a second wireless communications device in a recurring time slot, said quality of service related signal being a broadcast signal corresponding to an existing peer to peer link 404, a module for receiving a connection identifier and a data type identifier corresponding to said received quality of service related signal 406, a module for receiving a contention resolution signal from a third wireless communications device 408, and a module for receiving a connection identifier and a data type identifier corresponding to said received contention resolution signal from the third wireless communications device 410. Assembly of modules 400 further includes a module for receiving contention resolution signals from additional wireless communications devices 426 and a module for receiving a connection identifier and a data type identifier corresponding to each of said received additional connection resolution signals from the additional wireless communications devices. Assembly of modules 400 further includes a module for receiving a peer discovery of connection ID (CID) broadcast signal from a third wireless communications device 409, a module for receiving a connection identifier and a data type identifier corresponding to said received peer discovery signal or CID broadcast signal from the third wireless communications device 411, a module for received peer discovery of CID broadcast signals from additional wireless communications devices 427 and a module for receiving a connection identifier and data type identifier corresponding to each of said received additional peer discovery of CID broadcast signals from the additional wireless communications devices 429.

Assembly of modules 400 further includes a module for estimating a quality of service achievable at the first wireless communications device based on the received quality of service related signal 412, a module for deciding whether or not to establish a peer to peer link with another device based on the quality of service estimate 418, a module for controlling operation as a function of a link establishment decision 420, a module for establishing a peer to peer link with another device 422, a module for transmitting a quality of service related signal corresponding to an established peer to peer link between said first wireless communications device and another wireless communications device, and a module for controlling the first wireless communications device to refrain from establishing a peer to peer link with another device 424.

Module 412 includes a module for predicting the effect establishing an additional connection or communications session will have on the channel contention 414 and a module for estimating the quality of service the first wireless communications device will obtain if the connection or session is established based on the predicted effect of the channel contention 416.

Assembly of modules 400 further includes a module for generating a quality of service related signal corresponding to a peer to peer link of the first wireless communications device 426, a module for communicating the generated quality of service related signal in a recurring time slot 428 and a module for communicating a connection identifier and a data type identifier corresponding to the generated quality of service related signal 430. In some embodiments, the generated quality of service related signal communicates an obtained quality of service level for a peer to peer communications link of the first wireless communications device. In some embodiments the generated quality of service related signal communicates an obtained quality of service level for a specific type of data being communicated on a peer to peer communications link of the wireless communications device. In various embodiments, the communicated quality of service level is determined as a function of one or more of all of the following metrics corresponding to the peer to peer link of the first wireless communications device: an SINR, a packet drop rate, latency information, and a QoS level obtained by a particular class of data being communicated. In some embodiments, the communicated quality of service related signal conveys one or more of all of: an SINR, a packet drop rate, latency information, and a QoS level obtained by a particular class of data being communicated, and an ensemble QoS level for the peer to peer communications link of the first wireless communications device.

In some embodiments, the generated quality of service related signal is a peer discovery signal. In some other embodiments, the generated quality of service related signal is a connection ID broadcast signal. In still other embodiments, the generated quality of service related signal is a connection resolution signal, e.g., a contention resolution signal corresponding to a peer to peer traffic segment.

Module for communicating the generated quality of service related signal in a recurring time slot 428 transmits the generated signal from module 426 as a broadcast signal intended to be heard and used by other peer to peer devices in its vicinity in a recurring time slot. The recurring time slot is, e.g., one of a peer discovery time, a CID broadcast time slot, or a traffic segment scheduling time slot. In some embodiments, the peer discovery time slot corresponds to a device identifier currently held by the first communications device. In some embodiments, the peer CID broadcast time slot corresponds to a peer to peer connection identifier currently held by the first wireless communications device. In some embodiments, the traffic segment scheduling time slot corresponds to a peer to peer connection identifier currently held by the first wireless communications device.

Module for communicating a connection identifier and a data type identifier corresponding to the generated quality of service related signal 430, in some embodiments, communicates a connection identifier and a data type identifier corresponding to the information communicated by module 428. In some embodiments, module 430 communicates the connection identifier and data type identifier explicitly, e.g., as separate fields in a message. In some embodiments, module 430 communicates the connection identifier implicitly, e.g., by the selection of a particular set of resources in the connection identifier air link resource or the traffic segment scheduling air link resources, and communicates the data type identifier explicitly, e.g., by a field in a message. In some embodiments, module 428 and module 430 work together and transmit, e.g., broadcast a single message communicating quality of service related information, a corresponding connection identifier and a corresponding data type identifier.

Assembly of modules 400 includes a virtual queue module 432, a performance simulation module 434 and a module for determining whether or not to relinquish a currently held peer to peer link 436. Virtual queue module 432 is used for tracking packet loss rate and/or packet drop rate. Performance simulation module 434 is used for estimating the effect that establishing a new link will have on the system be for actually deciding to establish the new peer to peer link. Module for determining whether or not to relinquish a currently held peer to peer link 436 is used for deciding when the first communications device should relinquish a currently held link, e.g., when it should relinquish a peer to peer connection identifier. In some embodiments, module 436 relinquishes a currently held peer to peer link when the packet loss ratio is above a predetermined threshold.

In some embodiments, said quality of service related signal is a broadcast signal that communicates information about an obtained quality of service level. In some embodiments, the quality of service related signal from the second wireless communications device communicates performance metric information indicating a performance level obtained by said second wireless communications device. In some such embodiments, the performance metric information includes at least one of a dropped packet rate, a latency, and a QoS level obtained by a particular class of data being communicated.

In some embodiments a quality of service related signal corresponds to a peer to peer connection identifier. In some such embodiments, a quality of service related signal is further transmitted in association with a data type identifier. In some embodiments, quality of service related signal, corresponding peer to peer connection identifier and associated data type identifier are transmitted according to a predetermined recurring broadcast transmission schedule.

In some embodiments, the module for estimating the quality of service achievable at the first wireless communications device 412 bases its estimate on contention resolution signals received from a plurality of different wireless communications devices, e.g., contention resolution signals communicating quality of service related information. In some embodiments, the module for estimating the quality of service achievable at the first wireless communications device 412 bases its estimate on peer discovery signals received from a plurality of different wireless communications devices, e.g., peer discovery signals communicating quality of service related information. In some embodiments, the module for estimating the quality of service achievable at the first wireless communications device 412 bases its estimate on connection ID broadcast signals received from a plurality of different wireless communications devices, e.g., connection ID broadcast signals communicating quality of service related information.

Figure 5:
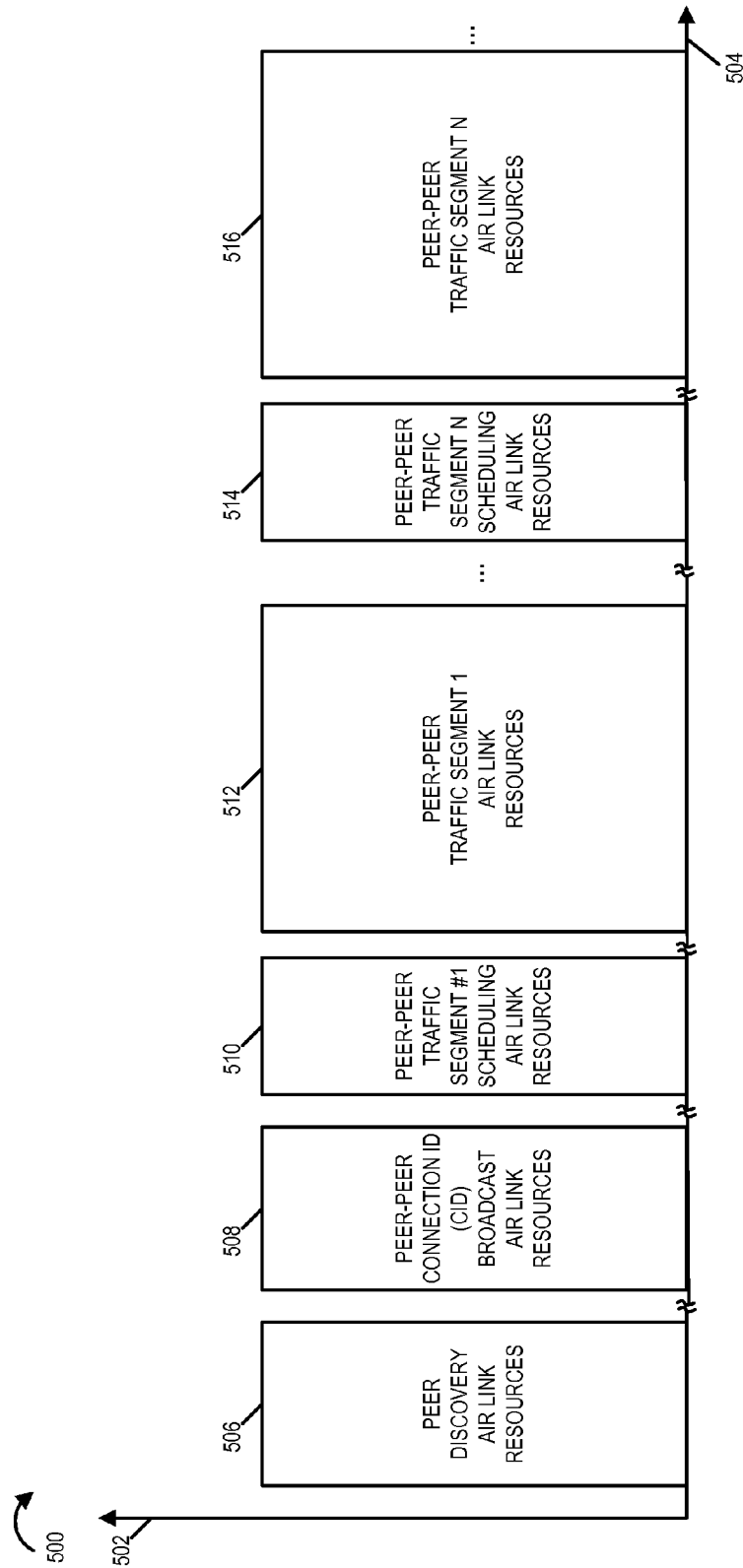
FIG. 5 is a drawing of an exemplary peer to peer recurring frequency-timing structure in accordance with an exemplary embodiment.

FIG. 5 is a drawing 500 of an exemplary peer to peer recurring frequency-timing structure in accordance with an exemplary embodiment. Drawing 500 includes a vertical axis 502 representing frequency, e.g., OFDM tones, and a horizontal axis 504 representing time, e.g., OFDM symbol transmission time intervals. The frequency timing structure of FIG. 5 includes peer discovery air link resources 506, peer to peer connection ID (CID) broadcast air link resources 508, and traffic resources corresponding to a plurality of indexed traffic segments (peer to peer traffic segment # 1 scheduling air link resources 510, peer to peer traffic segment 1 air link resources 512, . . . , peer to peer traffic segment N scheduling air link resources 514, peer to peer traffic segment N air link resources 516.

In some embodiments, a quality of service related broadcast signal, e.g., the received signal of step 204 of FIG. 2, is communicated using peer discovery air link resources in a peer discovery air link resource time slot which occurs during a time interval corresponding to peer discovery air link resources 506.

In some other embodiments, a quality of service related broadcast signal, e.g., the received signal of step 204 of FIG. 2, is communicated using peer to peer connection ID (CID) broadcast air link resources in CID broadcast time slot which occurs during a time interval corresponding to CID broadcast air link resources 508.

In still other embodiments, a quality of service related broadcast signal, e.g., the received signal of step 204 of FIG. 2, is communicated using peer to peer traffic segment scheduling resources, e.g., one of scheduling resources (510, . . . , 514) in a traffic scheduling resources time slot corresponding to the scheduling resource communicating the quality of service related information.

In some embodiments, a peer to peer wireless communications device synchronizes with the ad-hoc peer to peer network and acquires a locally unused peer to peer device identifier. The peer to peer wireless communications device then transmits a peer to peer discovery signal using a portion of the peer discovery air link resources 506.

In some embodiments, a peer to peer wireless communications device which has acquired a peer to peer device identifier, and which would like to establish a peer to peer link with another device, estimates the quality of service achievable if it should establish the intended link, and makes a decision whether or not to establish the link as a function of the estimation of the quality of service achievable. In some such embodiments, when the wireless communications device decides to establish a peer to peer link, it acquires a peer to peer connection identifier. The wireless communications device then transmits a CID broadcast signal using a portion of the peer to peer connection broadcast air link resources 510.

In some embodiments, a peer to peer device which has an existing peer to peer connection, e.g., which is holding a CID, may, and sometimes does, competes for the right to use one or more peer to peer traffic segments. When a peer to peer wireless communications device is competing to transmit peer to peer traffic in a traffic segment, the peer to peer device transmits and/or monitors for signals in the peer to peer traffic segment scheduling resources, e.g., resources 510 or 516.

Figure 6:
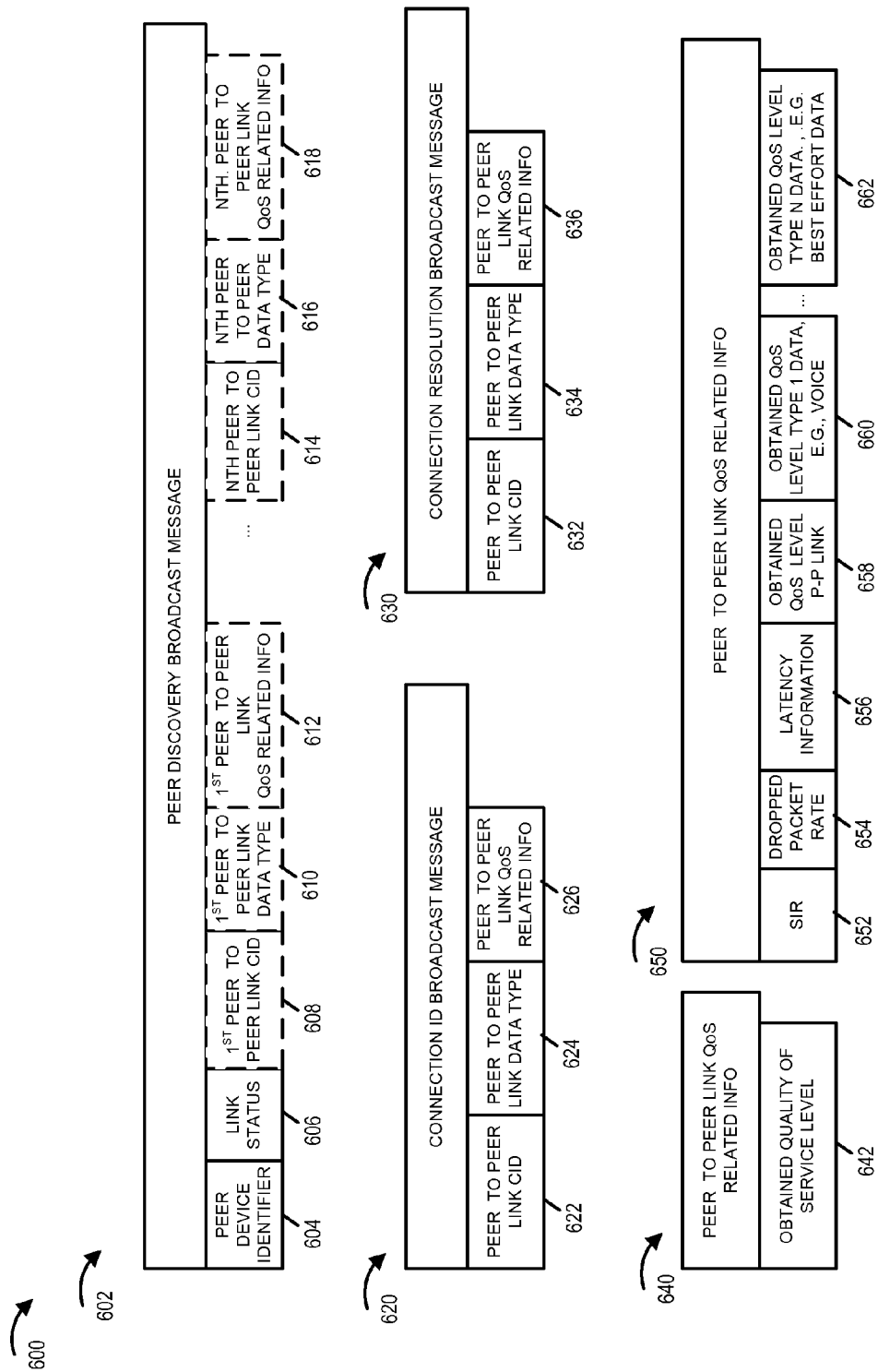
FIG. 6 illustrates exemplary broadcast messages used to communicate QoS related information corresponding to existing peer to peer links which is used in making admission control decisions in accordance with various embodiments.

Drawing 600 of FIG. 6 illustrates exemplary broadcast messages (602, 620, 630) used to communicate QoS related information (640 or 650) corresponding to existing peer to peer links which is used in making admission control decisions in accordance with various embodiments. Exemplary peer to peer discovery broadcast message 602 includes a peer device identifier 604 and link status information 606. Peer to peer device identifier 604 identifies the device transmitting message 602. Link status information 606 identifies whether or not the peer to peer device identified by identifier 604 has any peer to peer links, e.g., is currently holding any peer to peer connection IDs (CIDs). In some embodiments, link status information 606 indicates the number of CIDs being held by the peer device identified by identifier 604. When the device identified by peer device identifier 604 currently has at least one existing peer to peer links, peer discovery broadcast message 602 includes information corresponding to the one or more links (1st peer to peer link CID 608, $1^{st}$ peer to peer link data type 610, $1^{st}$ peer to peer link QoS related information 612, . . . , Nth peer to peer link CID 614, Nth peer to peer data type 616, Nth peer to peer link QoS related information 618).

Exemplary connection ID broadcast message 620 includes a peer to peer link CID 622, a peer to peer link data type 624, and peer to peer link QoS related information 626. Exemplary connection resolution broadcast message 630 includes a peer to peer link CID 632, a peer to peer link data type 634, and peer to peer link QoS related information 636.

In some embodiments, the peer device identifier 604 is communicated implicitly by means of the particular set of air link resources carrying message 602 within peer discovery air link resources 506, e.g., there is a predetermined mapping of peer discovery air link resources to peer discovery device identifiers within the recurring frequency timing structure.

In some embodiments, the peer to peer link connection identifier 622 is communicated implicitly by means of the particular set of air link resources carrying message 620 within peer to peer CID air link resources 508, e.g., there is a predetermined mapping of CID air link resources to CIDS within the recurring frequency timing structure.

In some embodiments, the peer to peer link connection identifier 622 is communicated implicitly by means of the particular set of air link resources carrying message 630 within peer to peer traffic scheduling resources (510, . . . , 514) e.g., there is a predetermined mapping of scheduling air link resources to CIDs within the recurring frequency timing structure. In some embodiments, the connection resolution broadcast message 630 is communicated as part of traffic transmission request signaling. In some embodiments, the connection resolution broadcast message 630 is communicated along with a traffic transmission request message. In some embodiments, the connection resolution broadcast message 630 is communicated as part of traffic transmission request response signaling. In some embodiments, the connection resolution broadcast message 630 is communicated along with a traffic transmission request response message.

In some embodiments, the peer to peer link data type information, e.g., information 610, 616, 624, 634, indicates one of a plurality of alternative data types, e.g., voice, best effort data, etc. In some embodiments, indicated data type is the single data type being communicated over the link. In some embodiments, the indicated data type is the predominate data type being communicated over the link. In some embodiments, the indicated data type is the most urgent data type being communicated over the link. In some embodiments, the communicated data type is the highest priority data type being communicated over the link. In some embodiments, the peer to peer link data type information, e.g., information 610, 616, 624, 634, can, and sometimes does indicate a plurality of different data types, e.g., voice and best effort data, which are being communicated over the link. In some such embodiments, the peer to peer link data type information, e.g., information 610, 616, 624, 634, also communicates information indicating relative amounts of the different types of data being communicated.

Peer to peer link QoS related information 640 is, e.g., any of the peer to peer link related information (612, 618, 626 or 636). Information 640 includes an obtained QoS service level for the peer to peer link 642. In some embodiments, obtained QoS service level 642 is based on one or more or all of: an estimated or measured SINR for the link, a dropped packet rate for the link, and latency information corresponding to the link.

Peer to peer link QoS related information 650 is, e.g., any of the peer to peer link related information (612, 618, 626 or 636). Information 650 includes a measured of estimated SINR corresponding to the link 652, a dropped packet rate corresponding to the link 654, latency information corresponding to the link 656, obtained QoS level corresponding to the peer to peer links 658, e.g., an ensemble QoS level for the link, and an obtained QoS level corresponding to a plurality of different types of data being communicated on the link (obtained QoS level for type 1 data 660, e.g., for voice data, . . . obtained QoS level for type N data 662, e.g., for best effort data.)

Figure 7A:
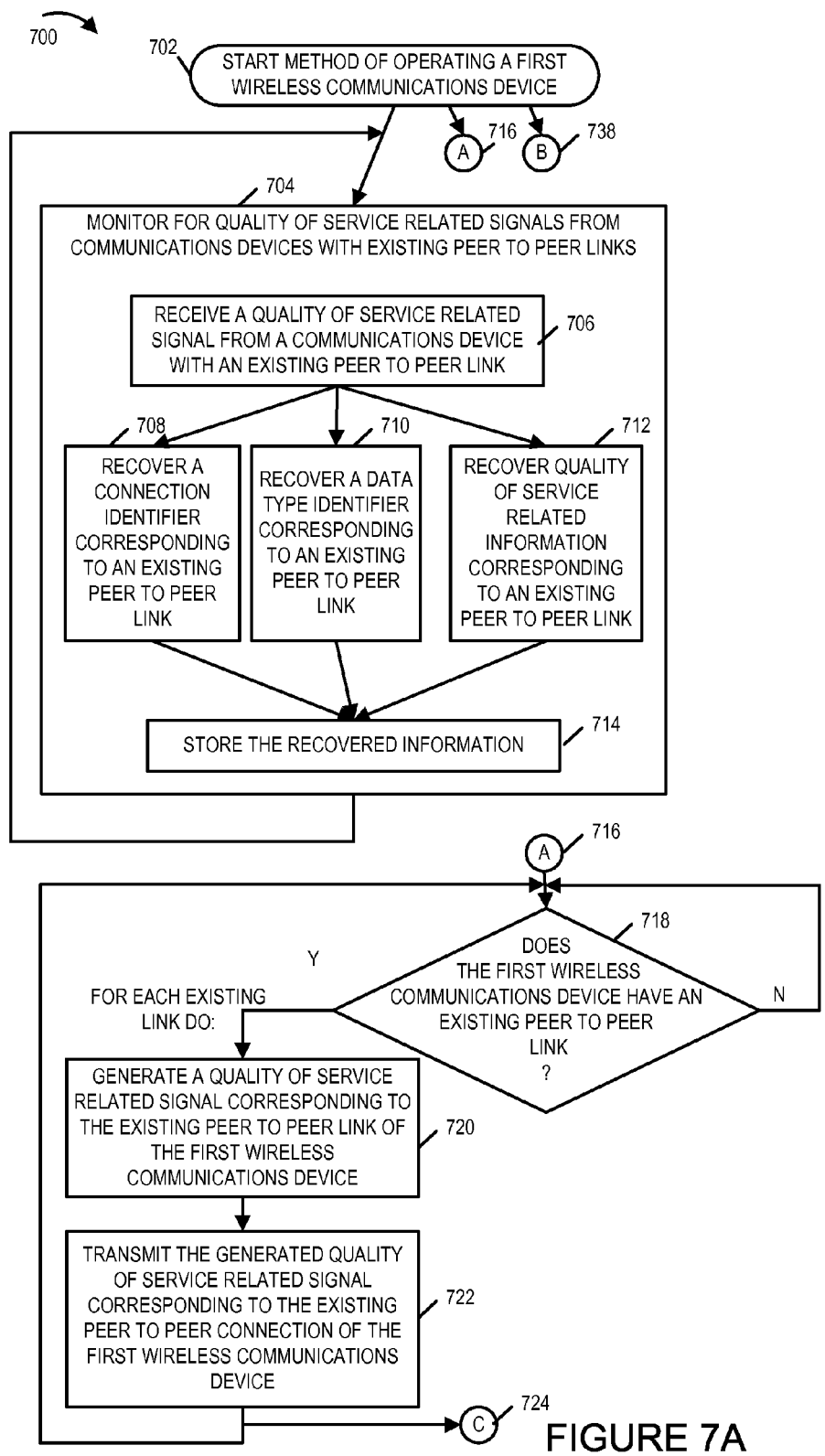
FIG. 7A is a first part of a flowchart of an exemplary method of operating a first wireless communications device in accordance with an exemplary embodiment.
Figure 7B:
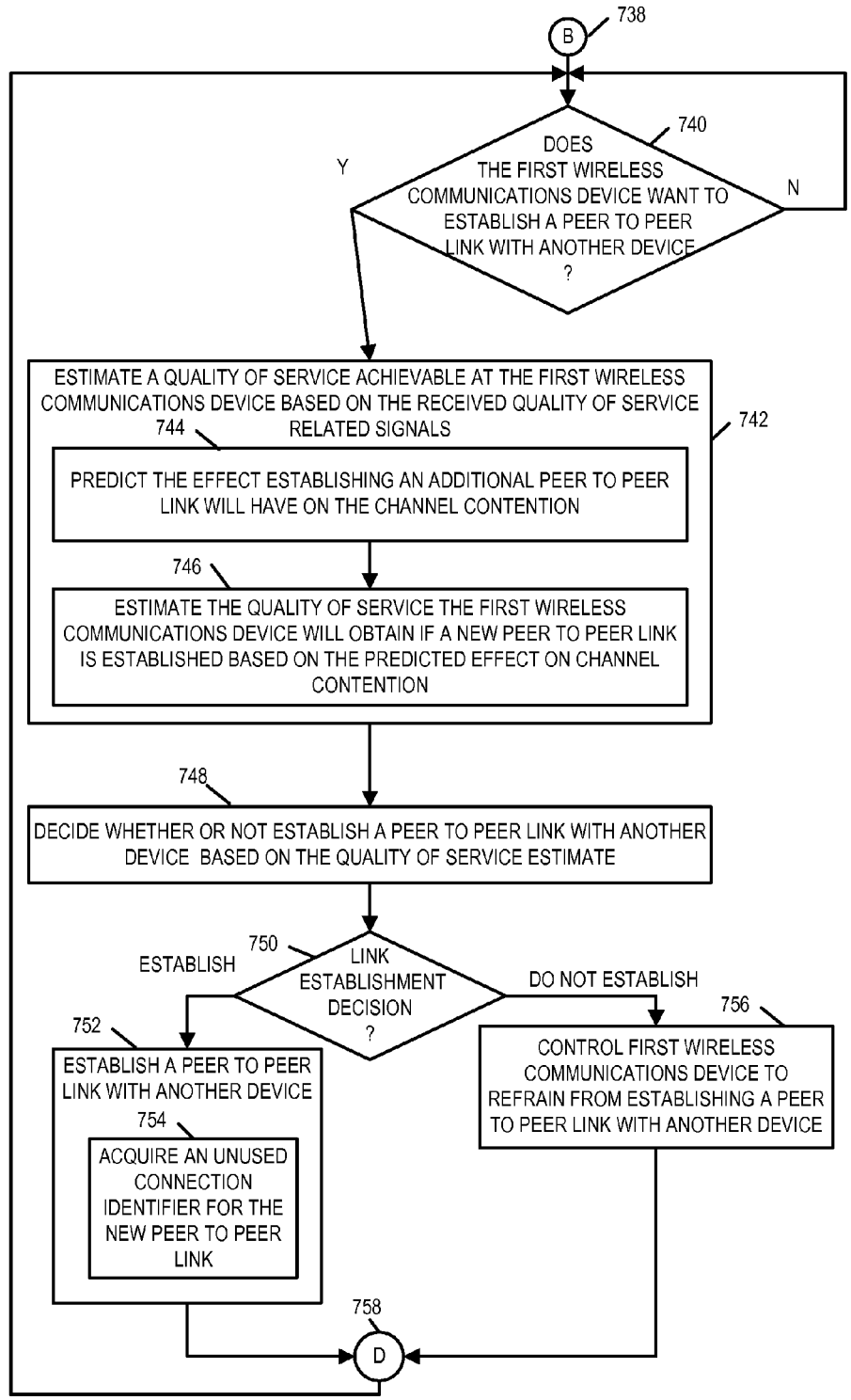
FIG. 7B is a second part of a flowchart of an exemplary method of operating a first wireless communications device in accordance with an exemplary embodiment.
Figures 7, 7A, 7B, 7C:
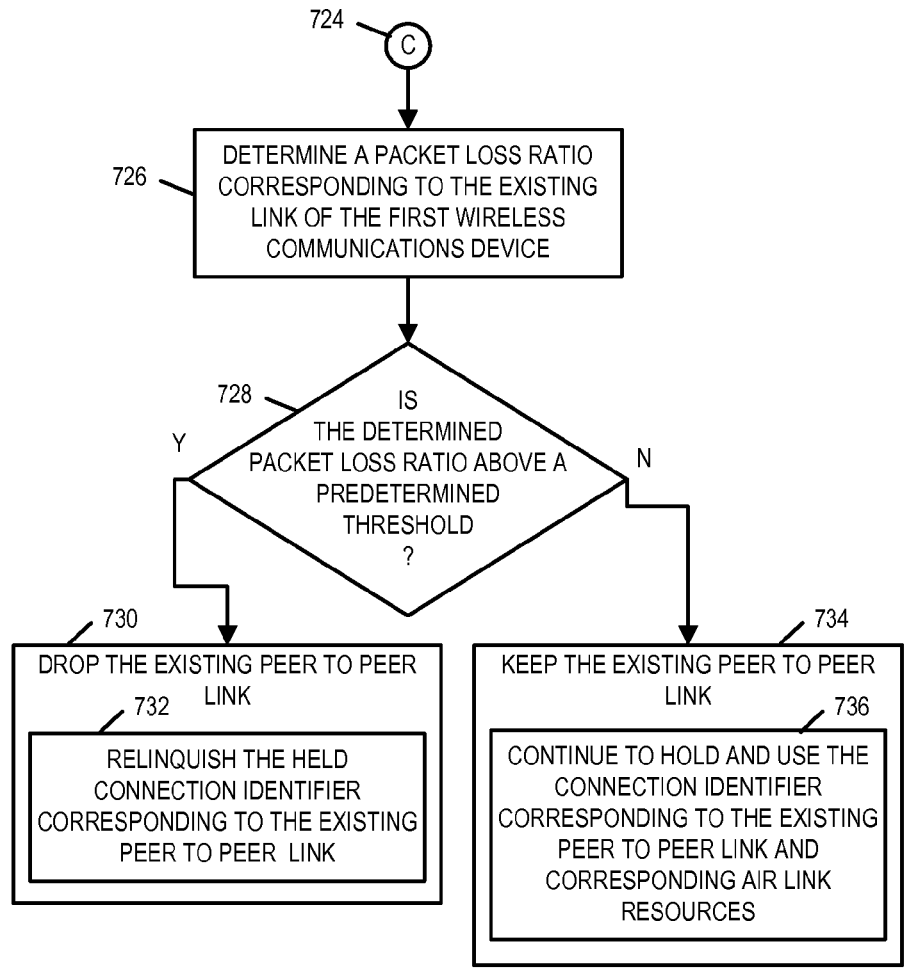
FIG. 7C is a third part of a flowchart of an exemplary method of operating a first wireless communications device in accordance with an exemplary embodiment.

FIG. 7, comprising the combination of FIG. 7A, FIG. 7B and FIG. 7C, is a flowchart of an exemplary method of operating a first wireless communications device in accordance with an exemplary embodiment. The first wireless communications device is, e.g., one of the peer to peer wireless communications devices (102, 104, 106, 108, 110, . . . , 112) of peer to peer network 100 of FIG. 1. Operation of the exemplary method starts in step 702 where the first wireless communications device is powered on and initialized. Operation proceeds from start step 702 to step 704, to step 718 via connecting node A 716, and to step 740 via connecting node B 738.

Returning to step 704, in step 704 the first wireless communications device monitors for quality of service related signals from wireless communications devices with existing peer to peer links. Step 704 includes steps 706, 708, 710, 712, and 714. In step 706 the first wireless communications device receives a quality of service related signal from a wireless communications device with an existing peer to peer link. Operation proceeds from step 706 to steps 708, 710 and 712. In step 708 the first wireless communications device recovers a connection identifier corresponding to an existing peer to peer link. In step 710 the first wireless communications device recovers a data type identifier corresponding to an existing peer to peer link. In step 712 the first wireless communications device recovers quality of service related information corresponding to an existing peer to peer link. Operation proceeds from steps 708, 710 and 712 to step 714 where the first wireless communications device stores the set of recovered information from steps 708, 710 and 712 corresponding to a particular existing peer to peer link. Step 704 is performed on an ongoing basis. In some embodiments, the first wireless communications device may, and sometimes does receive quality of service related signals from a plurality of devices concurrently.

In various embodiments, the received quality of service related signals are broadcast signals intended to be received and recovered by other peer to peer devices in the vicinity of the device transmitting the quality of service related signal. In some embodiments, the quality of service related signals are one of: peer discovery signals, connection ID broadcast signals and contention resolution signals, e.g., traffic segment scheduling signals. In various embodiments, the quality of service related signals are transmitted in a recurring time slot, e.g., a peer discovery recurring time slot, a connection ID broadcast recurring time slot or a peer to peer traffic segment scheduling recurring time slot.

In some embodiments, the recovered connection identifier is communicated indirectly by the set of resources used to communicate the quality of service related signal. For example, in some embodiments, different non-overlapping sets of connection ID broadcast resources in a connection ID broadcast air link resource block map to different connection IDs. As another example, different non-overlapping sets of traffic transmission request resources and request response resources map to different connection IDs in a peer to peer traffic segment scheduling resource block. The recovered data identifier indicates the type of data, e.g., voice, latency dependent non-voice, best effort, mixture of different types of data, etc., being communicated over the peer to peer link. The recovered quality of service related information includes one or more or all of: SINR, packet loss rate, packet drop rate, latency information, an overall obtained quality of service level for the link, one or more obtained individual quality of service levels corresponding to different types of data being communicated over the link.

Returning to step 718, in step 718 the first wireless communications device determines if the first wireless communications device has an existing peer to peer link. If the first wireless communications device has an existing peer to peer link, then operation proceeds from step 718 to step 720 for each existing link; otherwise operation proceeds from the output of step 718 to the input of step 718. Returning to step 720, in step 720 the first wireless communications device generates a quality of service related signal corresponding to the existing peer to peer link of the first wireless communication device. Then in step 722 the first wireless communications device transmits the generated quality of service related signal corresponding to the existing peer to peer connection of the first wireless communications device. Operation proceeds from step 722 back to the input of step 718 and to step 726 via connecting node C 724.

In step 726 the first wireless communications device determines a packet loss ratio corresponding to the existing link of the first wireless communications device. Then, in step 728 the first wireless communications device compares the determined packet loss ratio to a predetermined threshold. If the determined packet loss ratio is above the predetermined threshold, then operation proceeds from step 728 to step 730 where the first wireless communications device drops the existing peer to peer link. Step 730 includes step 732 in which the first wireless communications device relinquishes the held connection identifier corresponding to the existing peer to peer link. Returning to step 728, if the first wireless communications device determines that the packet loss ratio is not above the predetermined threshold then the first wireless communications device proceeds from step 728 to step 734, in which the first wireless communications device keeps the existing peer to peer link. Step 734 includes step 736 in which the first wireless communications device continues to hold and use the connection identifier corresponding to the existing peer to peer link and corresponding air link resources, e.g., corresponding air link resources in a peer to peer connection ID block and peer to pEer traffic segment scheduling air link resource blocks.

Returning to step 740, in step 740 the first wireless communications device determines if the first wireless communications device wants to establish a peer to peer link with another device. If the first wireless communications device wants to establish a new peer to peer connection with another device, then operation proceeds from step 740 to steps 742; otherwise operation proceeds from the output of step 740 to the input of step 740.

Returning to step 742, in step 742 the first wireless communications device estimates a quality of service achievable at the first wireless communications device for the intended new peer to peer link based on the received quality of service related signals corresponding to existing links, e.g., information received, recovered and stored in multiple iterations of steps 706, 708, 710, 712 and 714 corresponding to a plurality of existing peer to peer links.

Step 742 includes step 744 and step 746. In step 744 the first wireless communications device predicts the effect establishing an additional peer to peer link will have on the channel contention. Then in step 746 the first wireless communications device estimates the quality of service the first wireless communications device will obtain for the new peer to peer link if the new peer to peer link is established based on the predicted effect of channel contention. Operation proceeds from step 742 to step 748.

In step 748 the first wireless communications device decides whether or not to establish a peer to peer link with another device based on the quality of service estimate. Operation proceeds from step 748 to step 750.

In step 750, if the first wireless communications device has decided to establish a peer to peer link with another device, then operation proceeds from step 750 to step 752; otherwise, operation proceeds from step 750 to step 756.

Returning to step 752, in step 752 the first wireless communications device establishes a peer to peer link with another device. Step 752 includes step 754 in which the first wireless communications device acquires an unused connection identifier for the new peer to peer link. Operation proceeds from step 752 to connecting node D 758. Returning to step 756, in step 756 the first wireless communications device is controlled to refrain from establishing a new peer to peer link with another device. Operation proceeds from step 756 to connecting node D 758. Operation proceeds from connecting node D 758 to the input of step 740.

Figure 8:
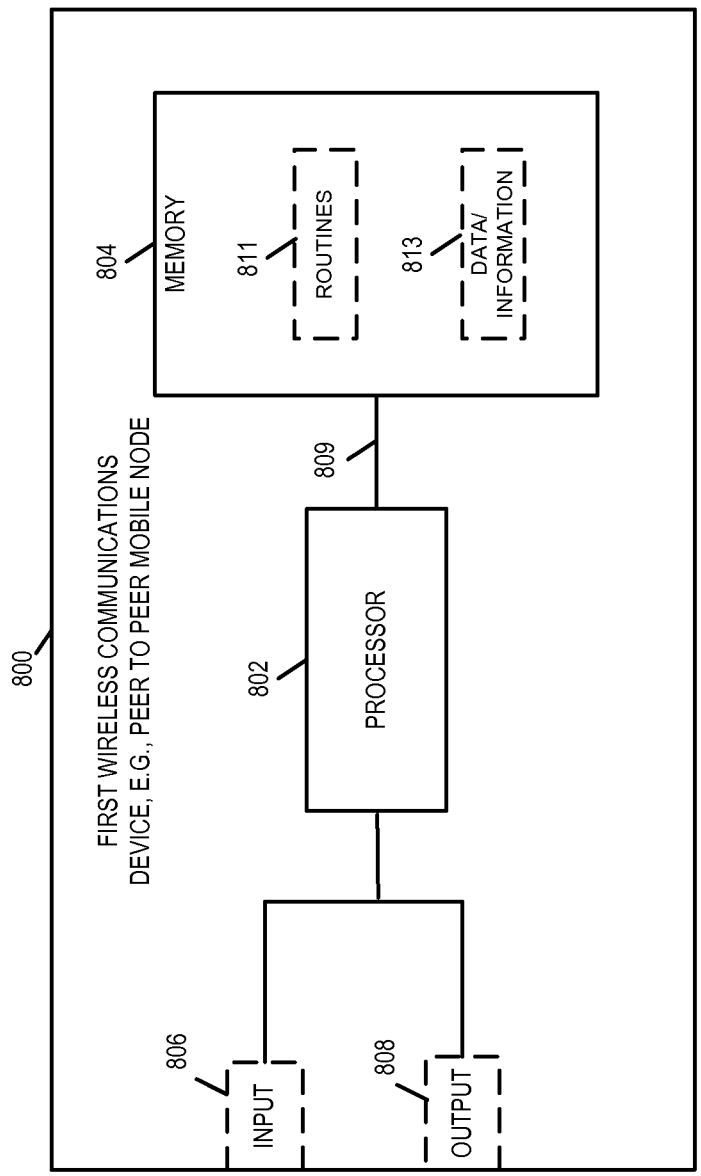
FIG. 8 is a drawing of an exemplary first wireless communications device in accordance with an exemplary embodiment.

FIG. 8 is a drawing of an exemplary first wireless communications device 800, e.g., a peer to peer wireless communications device, in accordance with an exemplary embodiment. Exemplary first communications device 800 is, e.g., one of the peer to peer wireless communications devices of system 100 of FIG. 1. Exemplary first wireless communications device 800 may, and sometimes does, implement a method in accordance with flowchart 700 of FIG. 7.

First wireless communications device 800 includes a processor 802 and memory 804 coupled together via a bus 809 over which the various elements (802, 804) may interchange data and information. Communications device 800 further includes an input module 806 and an output module 808 which may be coupled to processor 802 as shown. However, in some embodiments, the input module 806 and output module 808 are located internal to the processor 802. Input module 806 can receive input signals. Input module 806 can, and in some embodiments does, include a wireless receiver and/or a wired or optical input interface for receiving input. Output module 808 may include, and in some embodiments does include, a wireless transmitter and/or a wired or optical output interface for transmitting output. In some embodiments, memory 804 includes routines 811 and data/information 813. In some embodiments, processor 802 is configured to perform each of the steps of the method of flowchart 800.

Figure 9A:
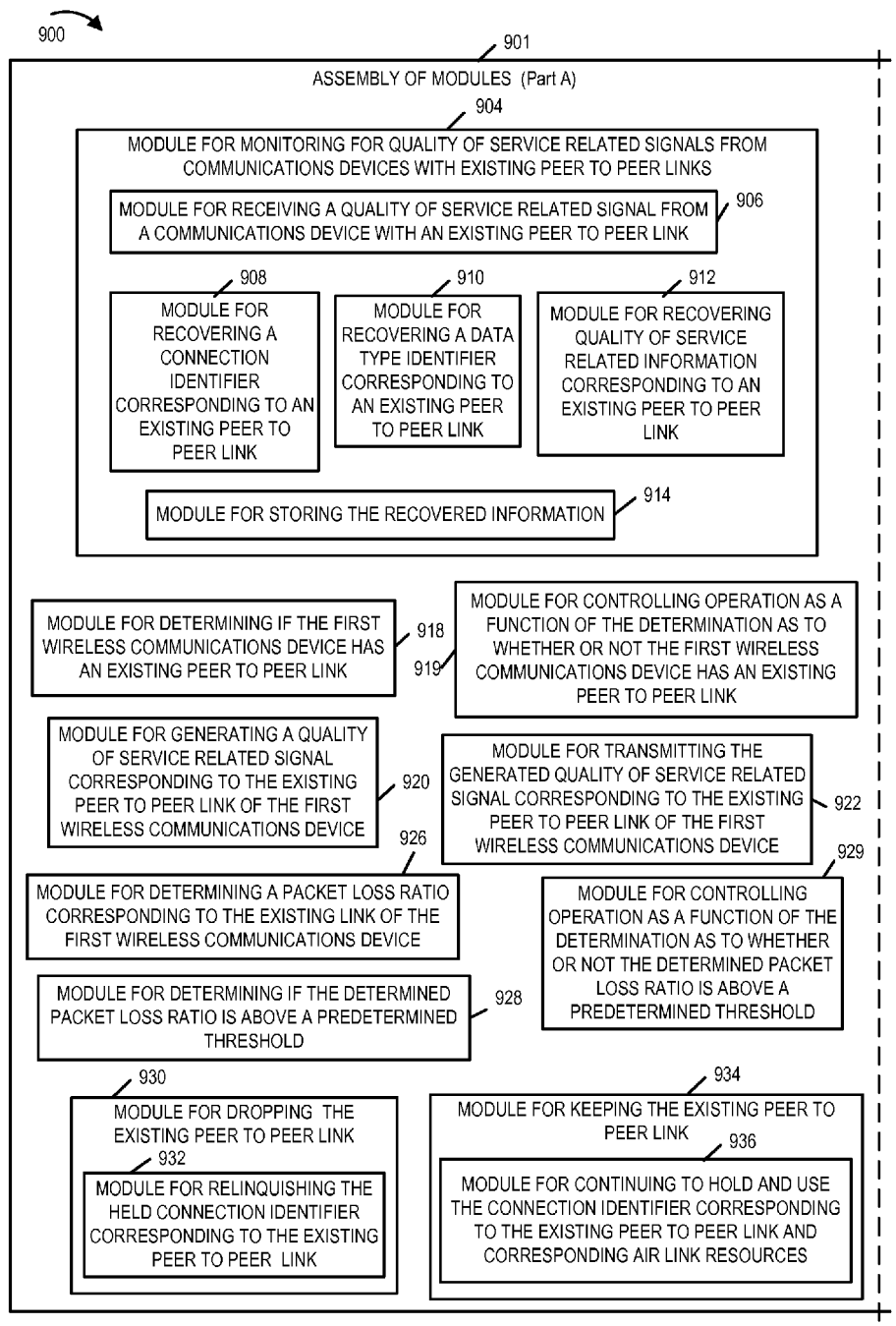
FIG. 9A is a first portion of an assembly of modules which can, and in some embodiments is, used in the exemplary first wireless communications device illustrated in FIG. 8.
Figures 9, 9B:
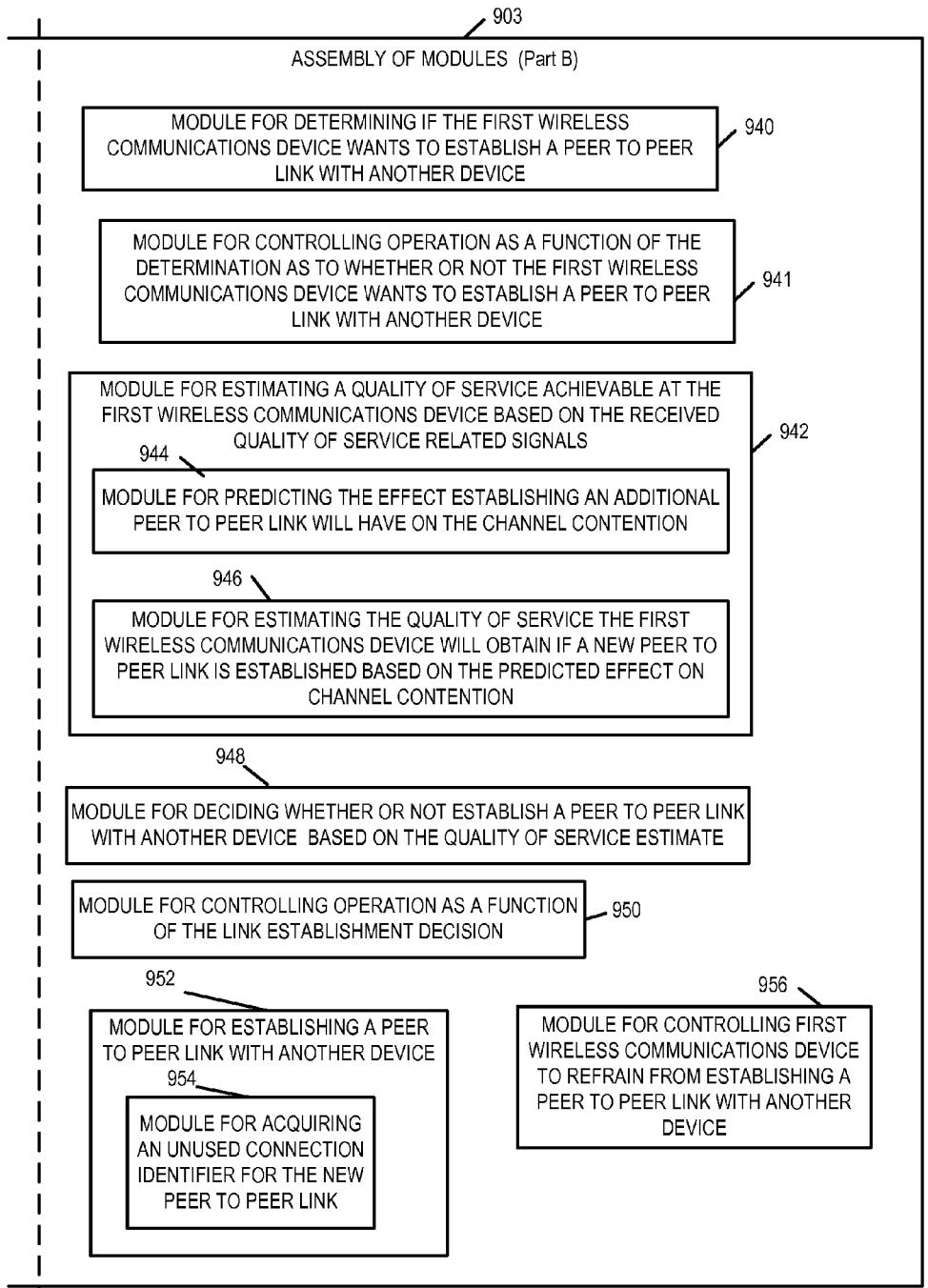
FIG. 9B is a second portion of an assembly of modules which can, and in some embodiments is, used in the exemplary first wireless communications device illustrated in FIG. 8.

FIG. 9 is an assembly of modules 900, comprising the combination of Part A 901 and Part B 903, which can, and in some embodiments is, used in the exemplary first wireless communications device 800 illustrated in FIG. 8. The modules in the assembly 800 can be implemented in hardware within the processor 802 of FIG. 8, e.g., as individual circuits. Alternatively, the modules may be implemented in software and stored in the memory 804 of first communications device 800 shown in FIG. 8. In some such embodiments, the assembly of modules 800 is included in routines 811 of memory 804 of device 800 of FIG. 8. While shown in the FIG. 8 embodiment as a single processor, e.g., computer, it should be appreciated that the processor 802 may be implemented as one or more processors, e.g., computers. When implemented in software the modules include code, which when executed by the processor, configure the processor, e.g., computer, 802 to implement the function corresponding to the module. In some embodiments, processor 802 is configured to implement each of the modules of the assembly of modules 800. In embodiments where the assembly of modules 800 is stored in the memory 804, the memory 804 is a computer program product comprising a computer readable medium, e.g., a non-transitory computer readable medium, comprising code, e.g., individual code for each module, for causing at least one computer, e.g., processor 802, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 9 control and/or configure the communications device 800 or elements therein such as the processor 802, to perform the functions of the corresponding steps illustrated and/or described in the method of flowchart 700 of FIG. 7.

Assembly of modules 900 includes a module for monitoring for quality of service related signal from communications devices with existing peer to peer links 904, a module for determining if the first wireless communications device has an existing peer to peer link 918, a module for controlling operation as a function of the determination as to whether or not the first wireless communications device has an existing peer to peer link 919, a module for generating a quality of service related signal corresponding to the existing peer to per link of the first wireless communications device 920, a module for transmitting the generated quality of service related signal corresponding to the existing peer to peer link of the first wireless communications device 922, a module for determining a packet loss ratio corresponding to the existing link of the first wireless communications device 926, a module for determining if the determined packet loss ratio is above a predetermined threshold 928, a module for controlling operation as a function of the determination as to whether or not the determined packet loss ratio is above a predetermined threshold 929, a module for dropping the existing peer to peer link 930 and a module for keeping the existing peer to peer link 934.

Module 904 includes a module for receiving a quality of service related signal from a communications device with an existing peer to peer link 906, a module for recovering a connection identifier corresponding to an existing peer to peer link 908, a module for recovering a data type identifier corresponding to an existing peer to peer link 910, a module for recovering quality of service related information corresponding to an existing peer to peer link 912 and a module for storing the recovered information 914 from modules 908, 910 and 912, e.g., as a set of data corresponding to the existing peer to peer link.

Module 930 includes a module for relinquishing the held connection identifier corresponding to the existing peer to peer link held by the first wireless communications device 932. Module 934 includes a module continuing to hold and use the connection identifier correspond to the existing peer to peer link of the first wireless communications device and the correspond air link resources associated with that connection identifier 936.

Assembly of modules 900 further includes a module for determining if the first wireless communications device want to establish a new peer to peer link with another wireless communications device 940, a module for controlling operation as a function of the determination as to whether or not the first wireless communications device wants to establish a peer to peer link with another device 941, a module for estimating a quality of service achievable at the first wireless communications device for the new link based on the received quality of service related signals 942, a module for deciding whether or not to establish a new peer to peer link with another wireless communications device based on the quality of service estimate 948, a module for controlling operation as a function of the link establishment decision 950, a module for establishing a new peer to peer link with another wireless communications device 952 and a module for controlling the first wireless communications device to refrain from establishing a peer to peer link with another wireless communications device 956. Module 942 includes a module for predicting the effect of establishing an additional peer to peer link will have on channel contention 944 and a module for estimating the quality of service the first wireless communications device will obtain for the new link if the new peer to peer link is established based on the predicted effect on the channel contention 946. Module 952 includes a module for acquiring and a locally unused connection identifier for the new peer to peer link 954.

Figure 10:
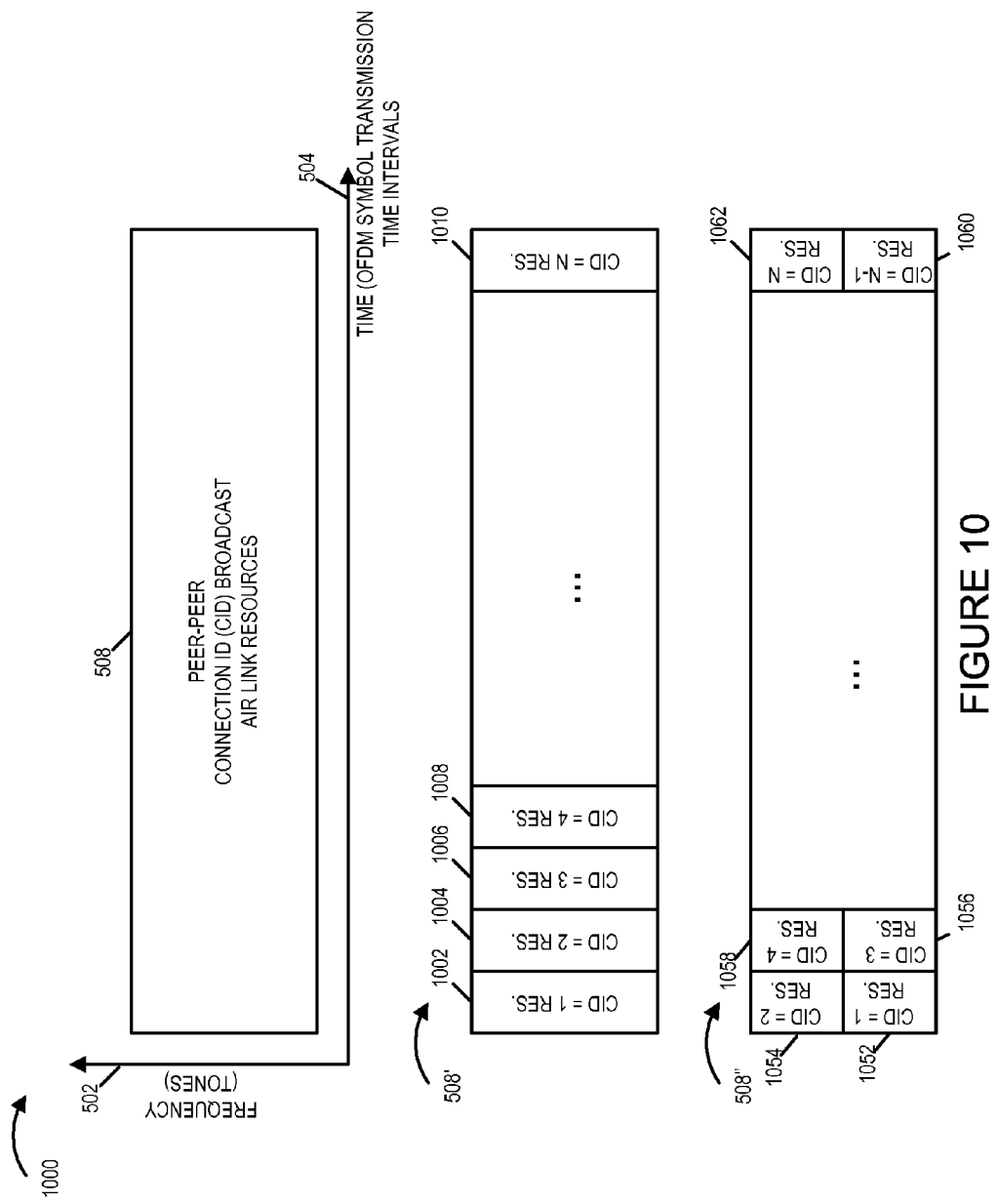
FIG. 10 illustrates exemplary predetermined mapping of air link resources corresponding to a peer to peer connection identifier in a recurring peer to peer frequency-timing structure.

FIG. 10 illustrates exemplary predetermined mapping of air link resources corresponding to a peer to peer connection identifier in a recurring peer to peer frequency-timing structure. Drawing 1000 includes a vertical axis 502 representing frequency, e.g., OFDM tones, and a horizontal axis 504 representing time, e.g., OFDM symbol transmission time intervals. Block 508 is a peer to peer connection ID broadcast air link resources block which was illustrated in FIG. 5. Block 508' is one exemplary representation of peer to peer CID broadcast air link resources 508. Block 508' includes air link resources corresponding to a plurality of CIDs which may be used in the peer to peer network (CID=1 air link resources 1002, CID=2 air link resources 1004, CID=3 air link resources 1006, CID=4 air link resources 1008, . . . , CID=N air link resources 1010). In some embodiments, each set of air link resources corresponding to a CID, e.g., CID=1 air link resources 1052 is a set of OFDM tone-symbols, where a tone-symbol is one tone for one symbol transmission time interval. Block 508" is another exemplary representation of peer to peer CID broadcast air link resources 508. Block 508" includes air link resources corresponding to a plurality of CIDs which may be used in the peer to peer network (CID=1 air link resources 1052, CID=2 air link resources 1054, CID=3 air link resources 1056, CID=4 air link resources 1058, . . . , CID=N-1 air link resources 1060, CID=N air link resources 1062). In some embodiments, each set of air link resources corresponding to a CID, e.g., CID=1 air link resources 1052 is a set of OFDM tone-symbols. In the exemplary block 508' the resources of a particular CID broadcast time slot correspond to a single peer to peer link in accordance with a predetermined mapping. In the exemplary block 508" the resources of a particular CID broadcast time slot correspond to two peer to peer links in accordance with a predetermined mapping. In other embodiments, there may be more than two CIDs mapped to a slot. In some embodiments, a slot in the CID broadcast block is a single OFDM symbol transmission time interval wide. In some other embodiments, a slot in the CID broadcast block is a plurality of OFDM symbol transmission time interval wide, e.g., a few symbol transmission time intervals wide, e.g., 3 or less. In some embodiments, a resource in the peer to peer CID broadcast block corresponding to a CID maps to a single tone for a predetermined number of continuous OFDM symbol transmission time intervals, e.g., 7. The use of the predetermined mapping of resources to particular CIDs facilitates the implicit communication of the CID, e.g., a signal communicated on the resource indicates that the CID is currently held and occupied. The quality of service related information, and in some embodiments, the corresponding data type identifier, for a particular peer to peer link is communicated using the resources corresponding to that particular peer to peer link. FIG. 10 illustrates an example in which CIDs are implicitly communicated in the peer to peer connection ID air link resources block 508. In various embodiments, the same approach is used in the peer to peer traffic scheduling air link resource blocks (510, . . . , 514).

FIGS. 11-14 illustrate an example in which a wireless communications device decides to establish a new peer to peer connection based on quality of service related information received from devices with existing peer to peer connections in accordance with an exemplary embodiment.

Figure 11:
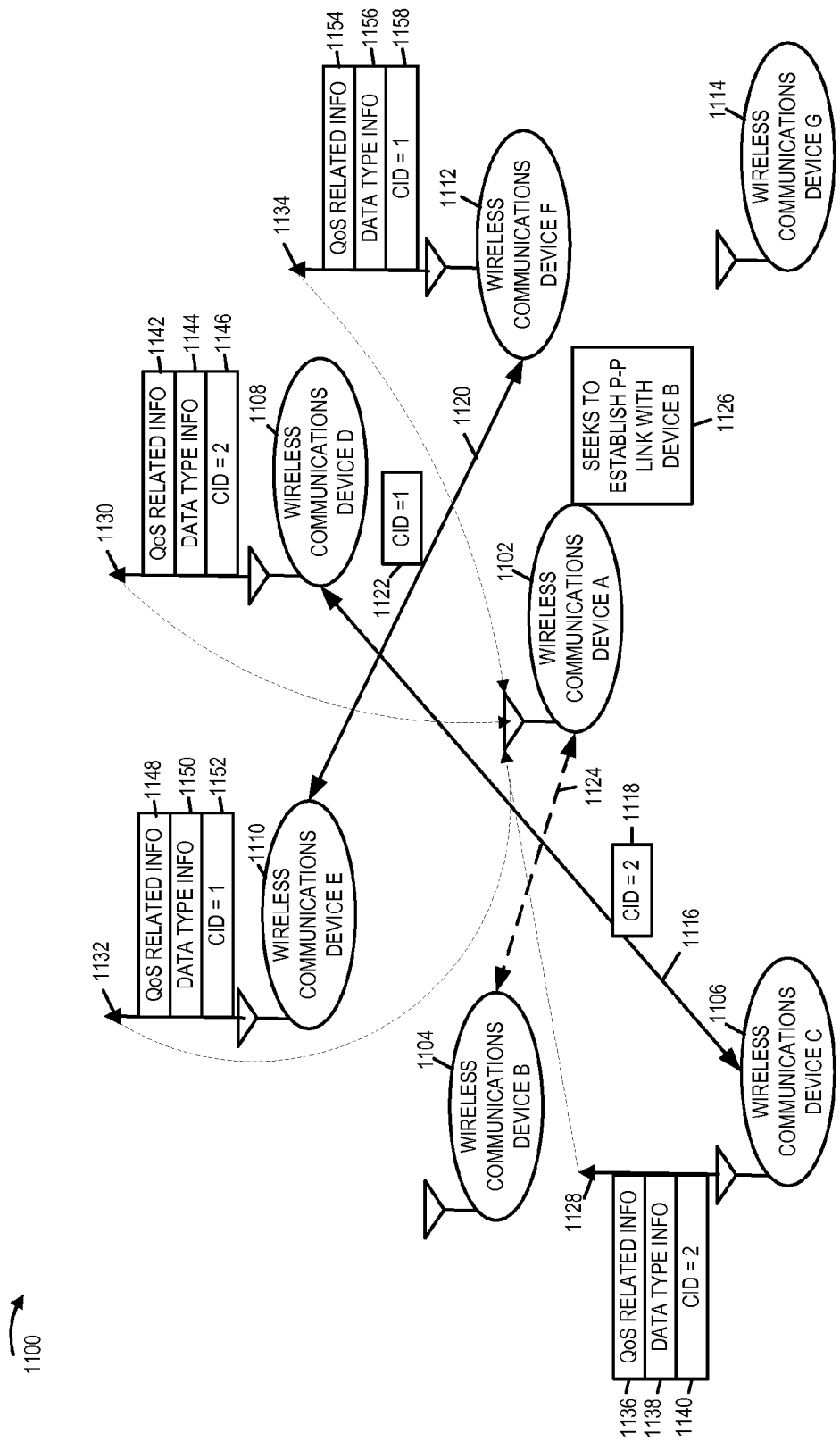
FIG. 11 illustrates wireless communications devices with existing peer to peer links in an ad-hoc peer to peer network transmitting quality of service related information in accordance with an exemplary embodiment.

Drawing 1100 of FIG. 11 illustrates a plurality of wireless communications devices (wireless communications device A 1102, wireless communications device B 1104, wireless communications device C 1106, wireless communications device D 1108, wireless communications device E 1110, wireless communications device F 1112, wireless communications device G 1114), which are part of an ad-hoc peer to peer network. The wireless communications devices (1102, 1104, 1106, 1108, 1110, 1112, 1114) are, e.g., any of wireless communications devices of FIG. 1, FIG. 3 and/or FIG. 8. Wireless communications device C 1106 has an existing peer to peer link 1116 with wireless communications device D 1108. Peer to peer link 1116 corresponds to connection identifier CID=2 as indicated by box 1118. Wireless communications device E 1110 has an existing peer to peer link 1120 with wireless communications device F 1112. Peer to peer link 1120 corresponds to connection identifier CID=1 as indicated by box 1122. Wireless communications device A 1102 would like to establish a new peer to peer link 1124 with wireless communications device B 1104, as indicated by box 1126.

Each of the devices (1106, 1108, 1110, 1112) with existing peer to peer links transmit signals (1128, 1130, 1132, 1134), respectively, as broadcast signals intended to be heard and recovered by other wireless communications devices in its vicinity. Signals (1128, 1130, 1132, 1134) are one of: peer discovery signals, connection ID broadcast signals, and contention resolution signals, e.g., peer to peer traffic segment scheduling signals, in accordance with a recurring timing structure. Signal 1128 communicates QoS related information 1136, data type information 1138, and CID=2 1140 corresponding to wireless communications device C's use of its link 1116. Signal 1130 communicates QoS related information 1142, data type information 1144, and CID=2 1146 corresponding to wireless communications device D's use of its link 1116. Signal 1132 communicates QoS related information 1148, data type information 1150, and CID=1 1152 corresponding to wireless communications device E's use of its link 1120. Signal 1134 communicates QoS related information 1154, data type information 1156, and CID=1 1158 corresponding to wireless communications device F's use of its link 1120. Wireless communications device A 1102 receives the signals (1128, 1130, 1132, 1134). Other devices may also receive the signals (1128, 1130, 1132, 1134) and use the information, e.g., for deciding whether or not to relinquish a currently held existing link.

Figure 12:
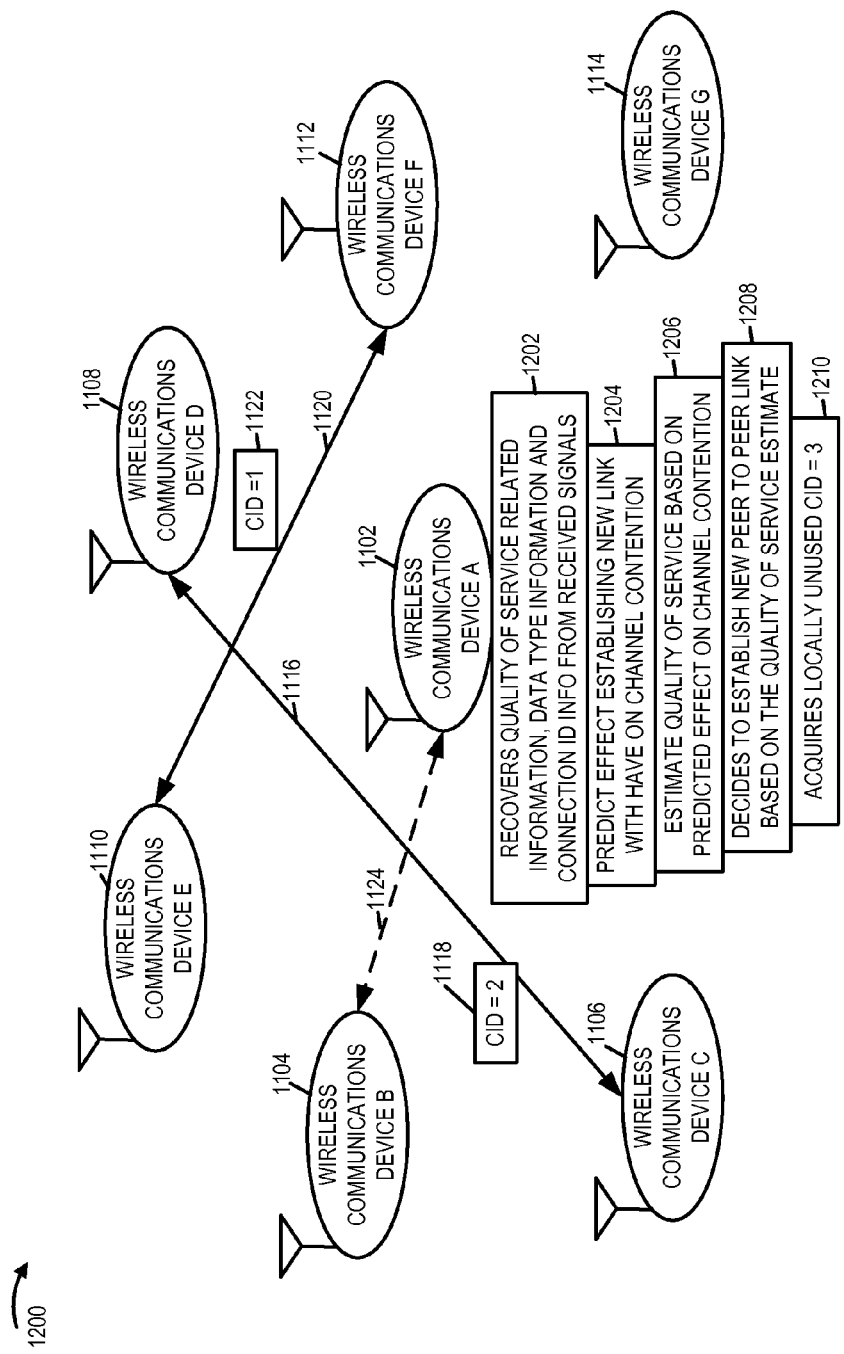
FIG. 12 illustrates a wireless communications device making a decision to establish a new peer to peer link based on received quality of service related information from other existing links.
Figure 13:
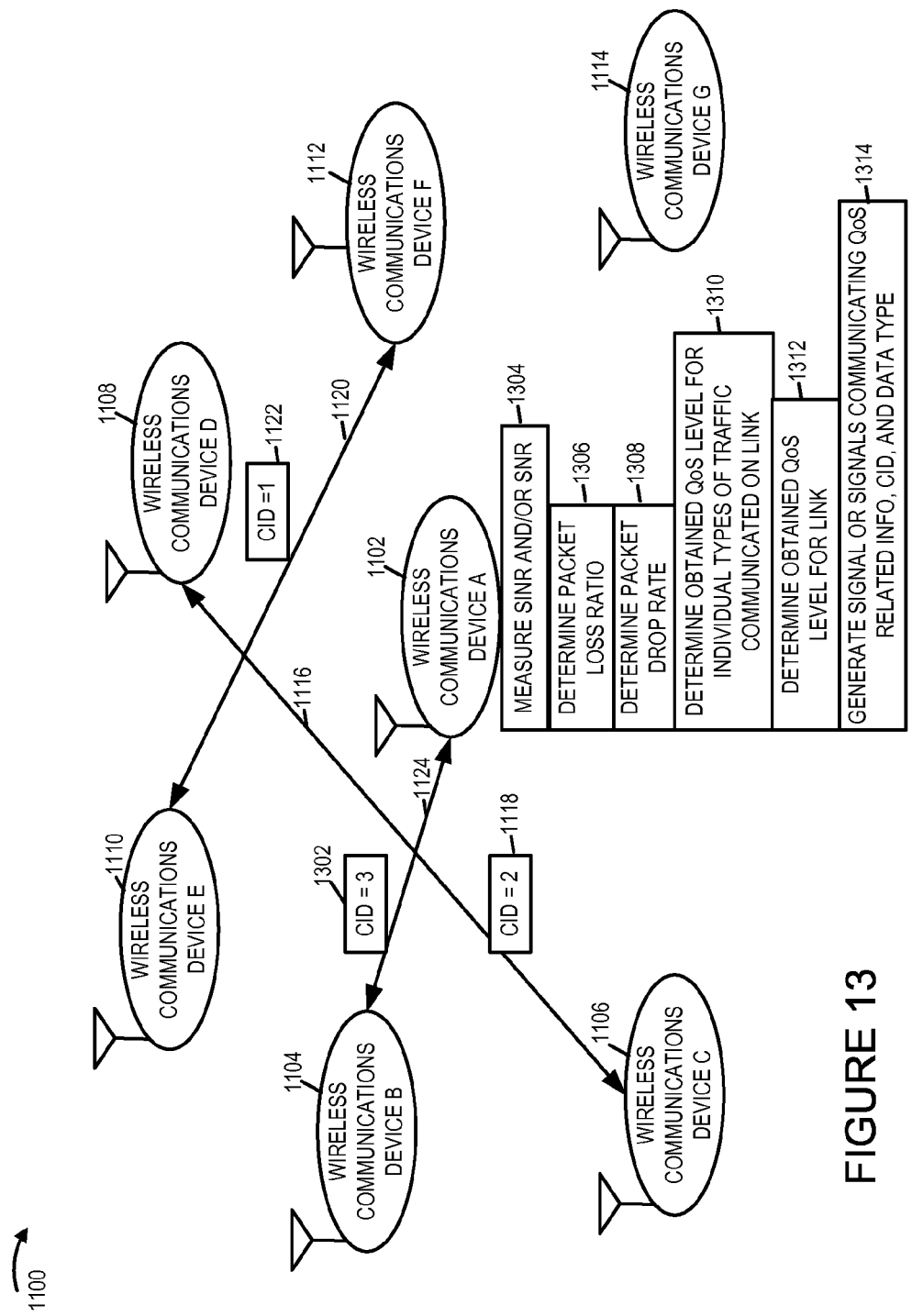
FIG. 13 illustrates the exemplary wireless communications device, which has previously established a peer to peer link, generating a signal to communicate quality of service related information corresponding to its currently held link.

Drawing 1200 of FIG. 12 indicates steps performed by wireless communications device A 1102 which seeks to establish a new peer to peer link. Wireless communications device A 1102 recovers the quality of service related information, data type information and connection ID information communicated in signals (1128, 1130, 1132, 1134) as indicated by box 1202. Wireless communications device A 1102 uses the recovered information to predict the effect establishing new link 1124 in the peer to peer system will have on channel contention as indicated by box 1204. Wireless communications device A 1102 estimates the quality of service wireless communications device A 1102 will obtain if new link 1124 is established based on the predicted effect on channel contention as indicated by box 1206. Wireless communications device A 1102 makes a decision whether or not to establish new peer to peer link 1124 based on the quality of service estimate, e.g., does the quality of service estimate exceed a predetermined threshold level. In this example, wireless communications device A 1102 decides to establish new peer to peer link 1124 as indicated by box 1208. Wireless communications device A 1102 acquires locally unused CID=3 to use for its new peer to peer link 1124 as indicated by box 1210.

Drawing 1300 indicates that wireless communications device A 1102 is using established peer to peer link 1124 with CID=3 as indicated by box 1302. Wireless communications device A 1102 measures SINR and/or SNR corresponding to link 1124 as indicated by box 1304. Wireless communications device A 1102 determines a packet loss ratio corresponding to link 1124 as indicated by box 1306. Wireless communications device A 1102 determines a packet drop rate corresponding to link 1124 as indicated by box 1308. Wireless communications device A 1102 determines an obtained QoS level for individual types of traffic communicated on link 1124 as indicated by box 1310. Wireless communications device A 1102 determines an obtained QoS level for traffic communicated on link 1124 as indicated by box 1312. Wireless communications device A 1102 generates a signal or signals communicating QoS related information, CID and a data type indicator, as indicated by box 1314. The QoS related information communicated in the generated signal includes one or more or all of information 1304, 1306, 1308, 1310 and 1312. In some embodiments, information 1310 and/or information 1312 is based on one or more or all of information 1304, 1306 and 1308.

Figure 14:
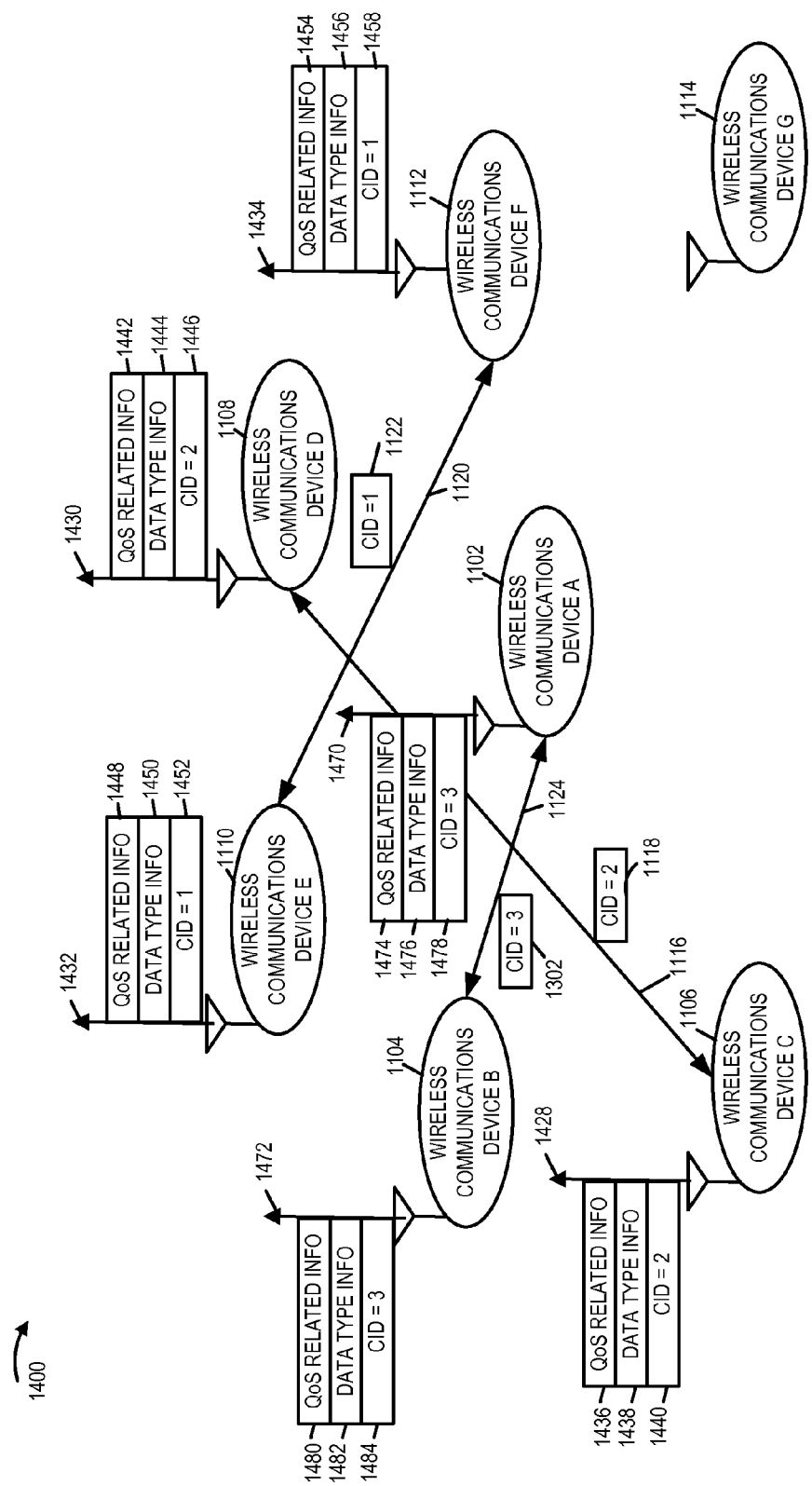
FIG. 14 illustrates wireless communications devices with existing peer to peer links in the ad-hoc peer to peer network transmitting quality of service related information in accordance with an exemplary embodiment.

Drawing 1400 of FIG. 14 illustrates each of the devices with currently held peer to peer links transmitting QoS related information which may be used by other devices to make decisions, e.g., whether to establish a new link and/or whether to drop a currently held link. Wireless communications device C 1106 has an existing peer to peer link 1116 with wireless communications device D 1108. Peer to peer link 1116 corresponds to connection identifier CID=2 as indicated by box 1118. Wireless communications device E 1110 has an existing peer to peer link 1120 with wireless communications device F 1112. Peer to peer link 1120 corresponds to connection identifier CID=1 as indicated by box 1122. Wireless communications device A 1102 has existing peer to peer link 1124 with wireless communications device B 1104. Peer to peer link 1124 corresponds to connection identifier CID=3 as indicated by box 1302.

Each of the devices (1106, 1108, 1110, 1112, 1102, 1104) with existing peer to peer links transmit signals (1428, 1430, 1432, 1434, 1470, 1472), respectively, as broadcast signals intended to be heard and recovered by other wireless communications devices in its vicinity. Signals (1428, 1430, 1432, 1434, 1470, 1472) are one of: peer discovery signals, connection ID broadcast signals, and contention resolution signals, e.g., peer to peer traffic segment scheduling signals, transmitted in accordance with a recurring timing structure. Signal 1428 communicates QoS related information 1436, data type information 1438, and CID=2 1440 corresponding to wireless communications device C's use of its link 1116. Signal 1430 communicates QoS related information 1442, data type information 1444, and CID=2 1446 corresponding to wireless communications device D's use of its link 1116. Signal 1432 communicates QoS related information 1448, data type information 1450, and CID=1 1452 corresponding to wireless communications device E's use of its link 1120. Signal 1434 communicates QoS related information 1454, data type information 1456, and CID=1 1458 corresponding to wireless communications device F's use of its link 1120. Signal 1470 communicates QoS related information 1474, data type information 1476, and CID=3 1478 corresponding to wireless communications device A's use of its link 1124. Signal 1472 communicates QoS related information 1480, data type information 1482, and CID=3 1484 corresponding to wireless communications device B's use of its link 1124.

In this example, the peer to peer communications links are represented as bi-directional links and each device of a links broadcasts quality of service related information corresponding to the link. In some embodiments, each device of a bi-directional peer to peer link is given air link resources in the same resource block, e.g., peer to peer connection ID broadcast block, to transmit quality of service related information. In some other embodiments, the resource used for communicating QoS related information corresponding to the CID of the bi-directional link alternates between the two devices of the bi-directional link, e.g., in a accordance with a predetermined schedule. In some other embodiments, the peer to peer link is uni-directional.

Various features and/or aspects of some, but not necessarily all, embodiments will be further described. Various embodiments are well suited for use in a peer to peer network, e.g., an ad-hoc peer to peer network without a central controller. In some exemplary embodiments, the approach for admission control, e.g., deciding whether to establish a connection or communications session, is for new links to check quality of service information relating to existing links in their area, e.g., neighborhood or sensing radius, prior to establishing a connection or communications session. To facilitate meaningful decisions about QoS levels which may be obtained for a particular type of service, one or more devices communicate information about the current quality of service they are receiving, e.g., SINR or packet loss rate, and/or the type of information they are communicating. In some embodiments this information is communicated in a broadcast channel along with a connection identifier.

For example, ad hoc devices may transmit on a broadcast channel or channels information such as the following:

[Connection Identifier (CID)] [Information Type, e.g., voice or best effort or video] [QoS Received]

where Connection Identifier identifies the particular connection;

where Information type indicates the type of data communicated over the connection; and where QoS Received indicates the QoS level obtained by the connection identified by the corresponding CID—the QoS information, in some embodiments, indicates one or more of: an SNR, packet loss rate, and packet latency.

Based on the information received from other devices, the device making the admission control decision, in some embodiments, decides whether or not to proceed with the connection or communications session based on the QoS level being received by other devices in the area for the type of traffic to be communicated and/or based on the current QoS level being received and an estimate of the QoS level which will be obtained if the connection or session is established. The estimate of the QoS level which will be obtained, in various embodiments, takes into consideration the expected effect of the additional load on the system if the new connection or communications session is established given the current level of QoS being experienced by the other devices in the area and/or the number of ongoing connections.

It should be appreciated that if the new link has traffic of a particular traffic type, e.g., voice, in some embodiments, the device making the admission control decision considers information from and/or consults with the neighbors with the same traffic type, but does not consider information from and/or consult with neighbors with a different traffic type. The new link could look at the rate or other performance metrics like the number of packets dropped.

One way of measuring for devices to maintain performance matrices which have delay sensitive links is to maintain a virtual queue. Packets arrive into virtual queue when the link has an arrival and packets depart when they are serviced. Dropped packets are not removed. So the virtual queue is an index for the number of packets dropped which allows for easy tracking of a packet loss or drop rate. To prevent the virtual queue from blowing up, in some embodiments, there could be, and sometimes are, additional packet departures corresponding to the tolerable packet losses. Existing links in the network, in some embodiments, also leave if their packet loss ratio is beyond an allowed threshold. This can be known by looking at their virtual queues.

One drawback of this mechanism is that the new link disturbs the system while making its admission decision. For example, when the system is at its full capacity and a new link arrives, it admits itself into the system to see if its virtual queue blows up. This can affect the performance of many other links in the system. To alleviate this problem, in some embodiments, the new link simulates its performance before it enters the system without disturbing the system. In some embodiments, it follows the scheduling policy, estimate its available SINR, and the corresponding rate and simulates packet arrival and departures and the virtual queues. In some embodiments, based on this virtual queue length it could make its admission decision.

In various embodiments a device, e.g., a wireless communications device in system 100 of FIG. 1, wireless communication device 300 of FIG. 3, wireless communications device 800 of FIG. 8, and/or a wireless communications device of FIGS. 11-14 includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless communications device, comprising:
   receiving a quality of service related signal from at least a second wireless communications device in a recurring time slot, said quality of service related signal being a broadcast signal corresponding to an existing peer to peer link, wherein said received quality of service related signal is a contention resolution signal which communicates quality of service information;
   receiving a contention resolution signal from a third wireless communications device;
   estimating a quality of service achievable at the first wireless communications device based on the received quality of service related signal and channel contention, wherein estimating the quality of service achievable at the first wireless communications device is based on contention resolution signals received from a plurality of different wireless communications devices and comprises:
   predicting the effect establishing an additional connection or communications session will have on channel contention, and
   estimating the quality of service the first wireless communications device will obtain if the connection or session is established based on the predicted effect on channel contention; and
   deciding to establish a peer to peer link with another device or not to establish a peer to peer link with another device based on the quality of service estimate.

2. The method of claim 1, wherein said quality of service related signal is a broadcast signal that communicates information about an obtained quality of service level, the method further comprising:
   transmitting a quality of service related signal corresponding to an established peer to peer link between said first wireless communications device and another wireless communications device.

3. The method of claim 1, wherein said quality of service related signal from the second wireless communications device communicates performance metric information indicating a performance level obtained by said second wireless communications device.

4. The method of claim 3, wherein the performance metric information includes at least one of a dropped packet rate, a latency, and a QoS level obtained by a particular class of data being communicated.

5. The method of claim 3, wherein said quality of service related signal corresponds to a peer to peer connection identifier.

6. The method of claim 5, wherein said quality of service related signal is further transmitted in association with a data type identifier, the method further comprising:
   receiving, in addition to said quality of service related signal, a corresponding connection identifier and an associated data type identifier.

7. The method of claim 6 wherein said quality of service related signal, corresponding peer to peer connection identifier and associated data type identifier are transmitted according to a predetermined recurring broadcast transmission schedule.

8. A first wireless communications device, comprising
   means for receiving a quality of service related signal from at least a second wireless communications device in a recurring time slot, said quality of service related signal being a broadcast signal corresponding to an existing peer to peer link, wherein said received quality of service related signal is a contention resolution signal which communicates quality of service information;
   means for receiving a contention resolution signal from a third wireless communications device;
   means for estimating a quality of service achievable at the first wireless communications device based on the received quality of service related signal and channel contention, wherein said means for estimating the quality of service achievable at the first wireless communications device is based on contention resolution signals received from a plurality of different wireless communications devices and comprises:
   means for predicting the effect establishing an additional connection or communications session will have on channel contention; and
   means for estimating the quality of service the first wireless communications device will obtain if the connection or session is established based on the predicted effect on channel contention; and means for deciding whether or not to establish a peer to peer link with another device based on the quality of service estimate.

9. The first wireless communications device of claim 8, wherein said quality of service related signal is a broadcast signal that communicates information about an obtained quality of service level, the first wireless communications device further comprising:
means for transmitting a quality of service related signal corresponding to an established peer to peer link between said first wireless communications device and another wireless communications device.

10. The first wireless communications device of claim 8, wherein said quality of service related signal from the second wireless communications device communicates performance metric information indicating a performance level obtained by said second wireless communications device.

11. A computer program product for use in a first wireless communications device, the computer program product comprising:
a non-transitory computer readable medium comprising:
code for causing at least one computer to receive a quality of service related signal from at least a second wireless communications device in a recurring time slot, said quality of service related signal being a broadcast signal corresponding to an existing peer to peer link, wherein said received quality of service related signal is a contention resolution signal which communicates quality of service information;
code for causing said at least one computer to receive a contention resolution signal from a third wireless communications device;
code for causing said at least one computer to estimate a quality of service achievable at the first wireless communications device based on the received quality of service related signal and channel contention, wherein the code for causing said at least one computer to estimate the quality of service achievable at the first wireless communications device is based on contention resolution signals received from a plurality of different wireless communications devices and comprises code for causing said at least one computer to:
predict the effect establishing an additional connection or communications session will have on channel contention, and
estimate the quality of service the first wireless communications device will obtain if the connection or session is established based on the predicted effect on channel contention; and
code for causing said at least one computer to decide to establish a peer to peer link with another device or not to establish a peer to peer link with another device based on the quality of service estimate.

12. A first wireless communications device comprising:
at least one processor configured to:
receive a quality of service related signal from at least a second wireless communications device in a recurring time slot, said quality of service related signal being a broadcast signal corresponding to an existing peer to peer link, wherein said received quality of service related signal is a contention resolution signal which communicates quality of service information;
receive a contention resolution signal from a third wireless communications device;
estimate a quality of service achievable at the first wireless communications device based on the received quality of service related signal and channel contention, wherein estimating the quality of service achievable at the first wireless communications device is based on contention resolution signals received from a plurality of different wireless communications devices and wherein said at least one processor is configured to:
predict the effect establishing an additional connection or communications session will have on channel contention, and
estimate the quality of service the first wireless communications device will obtain if the connection or session is established based on the predicted effect on channel contention;
decide whether or not to establish a peer to peer link with another device based on the quality of service estimate; and
memory coupled to said at least one processor.

13. The first communications device of claim 12, wherein said quality of service related signal is a broadcast signal that communicates information about an obtained quality of service level, and
wherein said at least one processor is further configured to transmit a quality of service related signal corresponding to an established peer to peer link between said first wireless communications device and another wireless communications device.

14. The first communications device of claim 12, wherein said quality of service related signal from the second wireless communications device communicates performance metric information indicating a performance level obtained by said second wireless communications device.

* * * * *